United States Patent
Katagiri

(10) Patent No.: US 9,948,805 B2
(45) Date of Patent: Apr. 17, 2018

(54) IMAGE READING DEVICE, IMAGE FORMING SYSTEM, AND PROGRAM

(71) Applicant: KONICA MINOLTA, INC., Chiyoda-ku, Tokyo (JP)

(72) Inventor: Tatsuya Katagiri, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/381,996

(22) Filed: Dec. 16, 2016

(65) Prior Publication Data

US 2017/0223206 A1 Aug. 3, 2017

(30) Foreign Application Priority Data

Feb. 2, 2016 (JP) ................................. 2016-017778

(51) Int. Cl.
  *H04N 1/46* (2006.01)
  *H04N 1/00* (2006.01)
  *H04N 1/04* (2006.01)

(52) U.S. Cl.
  CPC ..... *H04N 1/00761* (2013.01); *H04N 1/00042* (2013.01); *H04N 1/00366* (2013.01); *H04N 1/00374* (2013.01); *H04N 1/00379* (2013.01); *H04N 1/0464* (2013.01); *H04N 2201/0094* (2013.01)

(58) Field of Classification Search
  None
  See application file for complete search history.

(56) References Cited

U.S. PATENT DOCUMENTS

| | | | | |
|---|---|---|---|---|
| 6,490,421 | B2 * | 12/2002 | McIntyre | B41J 3/60 399/15 |
| 7,986,433 | B2 * | 7/2011 | Takaki | H04N 1/053 358/1.18 |
| 2002/0098023 | A1 * | 7/2002 | Mitomi | H04N 1/0057 399/374 |
| 2005/0286922 | A1 * | 12/2005 | Oki | H04N 1/0058 399/75 |
| 2006/0285162 | A1 * | 12/2006 | Honma | B41J 29/393 358/1.18 |
| 2009/0284808 | A1 * | 11/2009 | Hamada | H04N 1/00546 358/474 |
| 2014/0125007 | A1 * | 5/2014 | Sakano | G03G 15/602 271/265.01 |
| 2016/0021278 | A1 * | 1/2016 | Sakatani | H04N 1/2036 358/504 |
| 2016/0277629 | A1 * | 9/2016 | Waidman | H04N 1/00705 |

FOREIGN PATENT DOCUMENTS

JP 2006-072075 A 3/2006

* cited by examiner

*Primary Examiner* — Dung D Tran
(74) *Attorney, Agent, or Firm* — Buchanan Ingersoll & Rooney PC

(57) ABSTRACT

An image reading device having a mark formed on front and back of a sheet by an image forming device, and including a first scanner which reads the mark and a second scanner provided at a downstream side of the first scanner and which reads the mark, includes: a position adjusting unit configured to adjust front and back positions of the mark on the basis of a print position of the mark read by at least one of the first scanner and the second scanner; and a monitoring unit configured to monitor front and back misregistration of the mark on the basis of the front and back positions of the mark adjusted by the position adjusting unit.

10 Claims, 13 Drawing Sheets

IMAGE READING DEVICE, IMAGE FORMING SYSTEM, AND PROGRAM

The entire disclosure of Japanese Patent Application No. 2016-017778 filed on Feb. 2, 2016 including description, claims, drawings, and abstract are incorporated herein by reference in its entirety.

BACKGROUND OF THE INVENTION

Field of the Invention

The present invention relates to an image reading device, an image forming system, and a program.

Description of the Related Art

Conventionally, among image forming systems including a printer that can perform duplex printing and an image reading device that includes scanners, there is one that measures and adjusts front and back positions of images formed on a sheet, using one scanner (for example, see JP 2006-072075 A).

The conventional technology described in JP 2006-072075 A reads the front and back positions of the images formed on the sheet with one scanner, and thus conveys the sheet twice. Therefore, a time required for conveyance to read the images on the sheet is increased as the operation to read the front and back positions of the images is performed for each sheet. As a result, productivity as the image forming system is decreased.

Therefore, to avoid conveyance of the sheet twice for each sheet, there is one that reads the front and back positions of the images formed on the sheet, using two scanners. To be specific, one of the two scanners reads the image formed on a surface of the sheet, and the other of the two scanners reads the image formed on a back surface of the sheet. Accordingly, the images respectively formed on the front and back of the sheet can be read by conveying the sheet only once per sheet.

However, there is a mechanical difference in the scanners. That is, there is a machine difference. Therefore, even if the images formed on the front and back of the sheet are read using two scanners having the same performance, misregistration may be caused between the read positions of the two scanners. Therefore, the front and back positions of the images formed on the sheet may not be accurately read.

Further, in a case of mechanically adjusting the machine difference between the scanners, high component accuracy and high position accuracy are required. Therefore, the cost to adjust the machine difference between the scanners is increased.

By the way, front and back misregistration sometimes occurs in the images formed on both surfaces of the sheet even though setting on the printer side is not changed, as the duplex printing advances by the printer. Such front and back misregistration of the images occurs due to environmental conditions such as humidity in a print location and deterioration of mechanical durability. Therefore, the front and back misregistration of the images caused by the environmental conditions may be suddenly caused.

SUMMARY OF THE INVENTION

The present invention has been made to solve the conventional problems, and an object thereof is to provide an image reading device, an image forming system, and a program that can easily detect sudden front and back misregistration of images while accurately reading front and back positions of the images formed on a sheet at low cost.

To achieve the abovementioned object, according to an aspect, an image reading device having a mark formed on front and back of a sheet by an image forming device, and including a first scanner which reads the mark and a second scanner provided at a downstream side of the first scanner and which reads the mark, reflecting one aspect of the present invention comprises: a position adjusting unit configured to adjust front and back positions of the mark on the basis of a print position of the mark read by at least one of the first scanner and the second scanner; and a monitoring unit configured to monitor front and back misregistration of the mark on the basis of the front and back positions of the mark adjusted by the position adjusting unit.

According to the image reading device, sudden front and back misregistration of images can be easily detected while the front and back positions of the images formed on the sheet can be accurately read at low cost.

Furthermore, in the image reading device according to the present invention, the image reading device preferably further comprises: a machine difference adjusting unit configured to adjust a machine difference between the first scanner and the second scanner on the basis of the print position of the mark read by the first scanner, and the print position of the mark read by the second scanner, wherein the position adjusting unit preferably determines an adjustment reference position of the mark, the adjustment reference position serving as a reference of monitoring of the front and back misregistration of the mark by the monitoring unit when the machine difference has been adjusted by the machine difference adjusting unit.

According to the image reading device, a time required to detect the front and back misregistration of the mark can be shortened, compared with a case where the sheet is conveyed twice with one scanner.

Furthermore, in the image reading device according to the present invention, the machine difference adjusting unit preferably adjusts the machine difference on the basis of the mark formed on a same surface of the sheet.

According to the image reading device, the machine difference between the scanners can be accurately detected.

Furthermore, in the image reading device according to the present invention, in monitoring the front and back misregistration of the mark formed on the sheet, the monitoring unit preferably monitors a first adjustment reference misregistration amount between a first adjustment reference position of the mark formed on a first surface of the sheet, of the adjustment reference positions of the mark determined by the position adjusting unit, and the print position of the mark formed on the first surface of the sheet read by the first scanner, and monitors a second adjustment reference misregistration amount between a second adjustment reference position of the mark formed on a second surface of the sheet, of the adjustment reference positions of the mark determined by the position adjusting unit, and the print position of the mark formed on the second surface of the sheet read by the second scanner, and the position adjusting unit preferably adjusts the front and back positions of the mark on the basis of the first adjustment reference misregistration amount monitored by the monitoring unit and the second adjustment reference misregistration amount monitored by the monitoring unit.

According to the image reading device, the front and back misregistration of the mark can be monitored at low cost.

Furthermore, in the image reading device according to the present invention, a master document is preferably used as the sheet, in adjusting the machine difference, the print position of the mark formed on a first surface of the master document and the print position of the mark formed on a second surface of the master document are preferably formed in a same position in a front and back penetrating direction of the sheet, the machine difference adjusting unit preferably adjusts the machine difference on the basis of the print position of the mark formed on the first surface of the master document read by the first scanner and the print position of the mark formed on the second surface of the master document read by the second scanner, and the position adjusting unit preferably sets the print position of the mark formed on the master document to a design reference position of the mark, as the adjustment reference position of the mark, when the machine difference has been adjusted using the master document by the machine difference adjusting unit.

According to the image reading device, the machine difference between the scanners and the front and back positions of the mark can be accurately adjusted.

Furthermore, in the image reading device according to the present invention, in monitoring the front and back misregistration of the mark formed on the sheet, the monitoring unit preferably monitors a first design reference misregistration amount between the print position of the mark formed on a first surface of the sheet read by the first scanner, and a first design reference position of the mark formed on the first surface of the master document, of the design reference positions of the mark set by the position adjusting unit, and monitors a second design reference misregistration amount between the print position of the mark formed on a second surface of the sheet read by the second scanner, and a second design reference position of the mark formed on the second surface of the master document, of the design reference positions of the mark set by the position adjusting unit, and the position adjusting unit preferably adjusts the front and back positions of the mark on the basis of the first design reference misregistration amount monitored by the monitoring unit, and the second design reference misregistration amount monitored by the monitoring unit.

According to the image reading device, the front and back misregistration of the mark can be accurately monitored.

Furthermore, in the image reading device according to the present invention, the position adjusting unit preferably determines an adjustment reference position of the mark, the adjustment reference position serving as a reference of monitoring of the front and back misregistration of the mark by the monitoring unit, when the position adjusting unit has adjusted the front and back positions of the mark on the basis of the print position of the mark formed on a first surface of the sheet read by the first scanner, and the print position of the mark formed on a second surface of the sheet read by the first scanner.

According to the image reading device, the front and back misregistration of the mark can be monitored without being affected by the machine difference in the scanners.

Furthermore, in the image reading device according to the present invention, the second scanner preferably reads the mark formed on the sheet, when the front and back misregistration of the mark is monitored by the monitoring unit, the monitoring unit preferably monitors an adjustment reference misregistration amount between the adjustment reference position of the mark determined by the position adjusting unit and the print position of the mark read by the second scanner, in monitoring the front and back misregistration of the mark formed on the sheet, and the position adjusting unit preferably adjusts the front and back positions of the mark on the basis of the adjustment reference misregistration amount monitored by the monitoring unit.

According to the image reading device, the front and back misregistration of the mark can be especially significantly monitored without being affected by the machine difference between the scanners.

To achieve the abovementioned object, according to an aspect, an image forming system reflecting one aspect of the present invention comprises: the image reading device; and the image forming device.

According to the image forming system, sudden front and back misregistration of images can be easily detected while the front and back positions of the images formed on the sheet can be accurately read at low cost, similarly to the case of the image reading device.

Further, according to the image forming system, a feedback system with low cost as the entire system can be provided.

To achieve the abovementioned object, according to an aspect, a non-transitory recording medium storing a computer readable program reflecting one aspect of the present invention causes a computer that controls an image reading device having a mark formed on front and back of a sheet by an image forming device, and including a first scanner which reads the mark and a second scanner provided at a downstream side of the first scanner and which reads the mark, to function as: a position adjusting unit configured to adjust front and back positions of the mark on the basis of a print position of the mark read by at least one of the first scanner and the second scanner; and a monitoring unit configured to monitor front and back misregistration of the mark on the basis of the front and back positions of the mark adjusted by the position adjusting unit.

According to the program, sudden front and back misregistration of images can be easily detected while the front and back positions of the images formed on the sheet can be accurately read at low cost, similarly to the case of the image reading device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

First Embodiment

Figure 1:
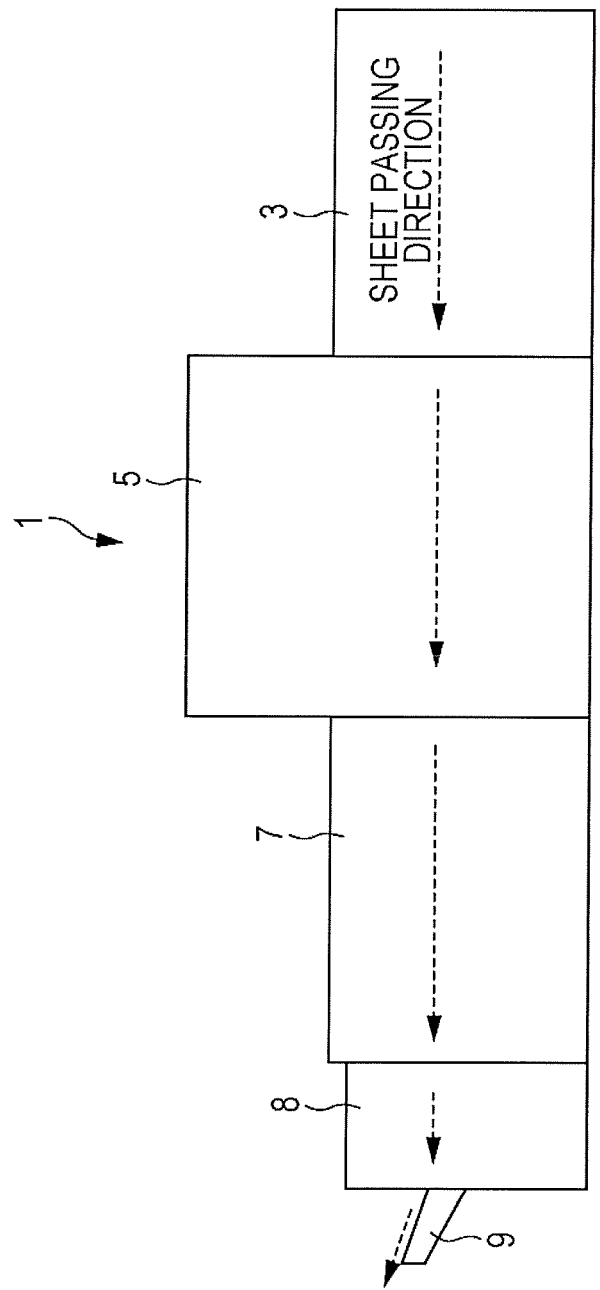
FIG. 1 is a diagram illustrating an example of an overall configuration of an image forming system in a first embodiment of the present invention.

FIG. 1 is a diagram illustrating an example of an overall configuration of an image forming system 1 in a first embodiment of the present invention. As illustrated in FIG. 1, the image forming system 1 includes a sheet feeding device 3, an image forming device 5, an image reading device 7, and a sheet discharging device 8. The sheet feeding device 3 feeds a sheet P to the image forming device 5. The image forming device 5 forms an image on the sheet P fed from the sheet feeding device 3. The image reading device 7 reads the sheet P on which the image has been formed by the image forming device 5, and executes various types of processing. The sheet discharging device 8 includes a sheet discharging tray 9, and discharges the sheet P conveyed from the image reading device 7 to the sheet discharging tray 9.

Figure 2:
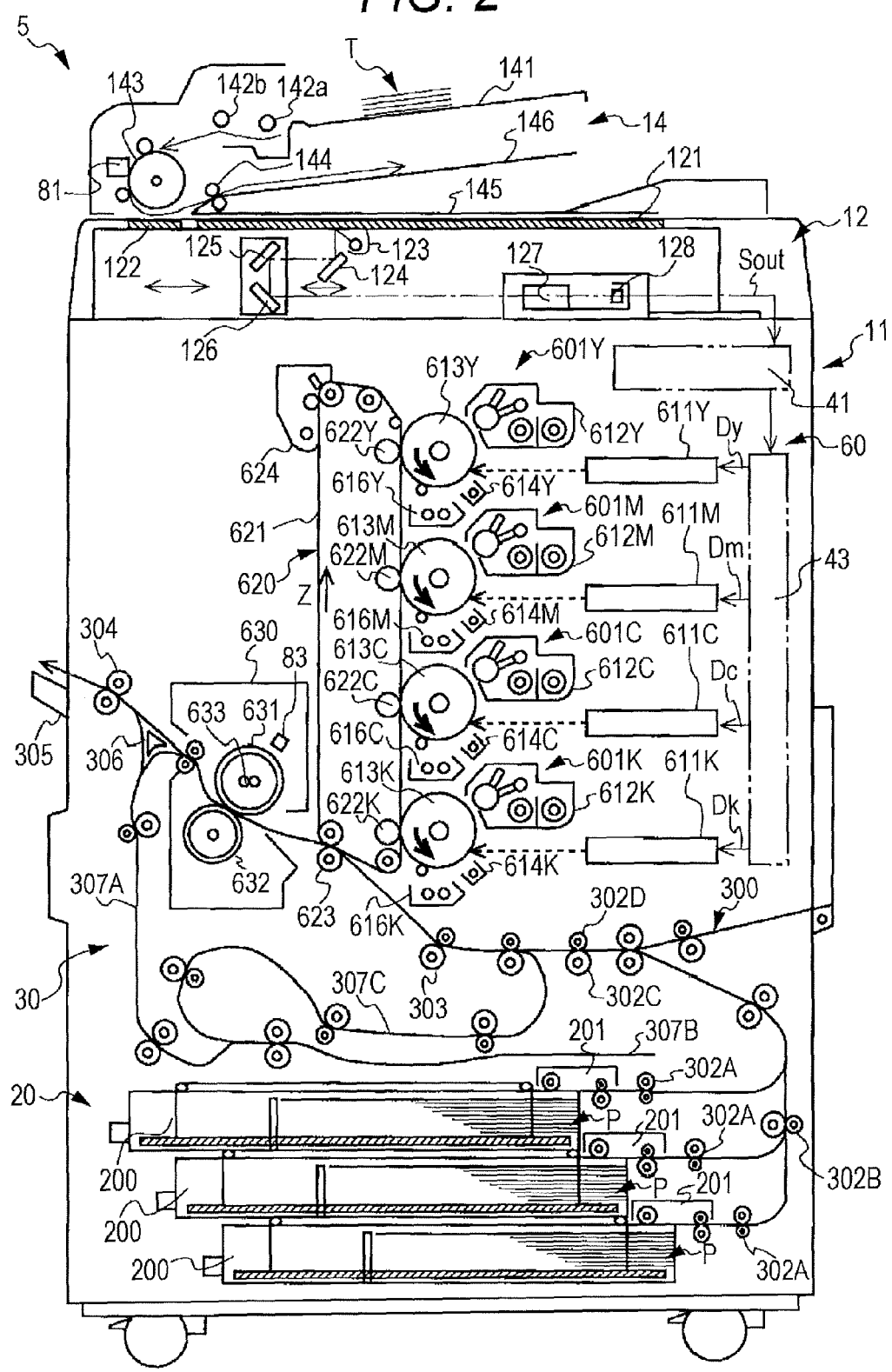
FIG. 2 is a diagram illustrating a configuration example of an image forming device in the first embodiment of the present invention.

Next, the image forming device 5 will be specifically described. FIG. 2 is a diagram illustrating an example of an internal configuration of the image forming device 5 according to the first embodiment. As illustrated in FIG. 2, the image forming device 5 is an example of a color copier, and is a device that acquires image information by reading a color image formed on a document T, superimposes colors on the basis of the acquired image information, and forms a color image. The image forming device 5 is favorably applied to a color printer, a facsimile device, or a multifunction machine of the color printer and the facsimile device, other than the color copier.

The image forming device 5 includes an image forming device main body 11. A color image reading portion 12 and an automatic document feeder 14 are arranged on an upper portion of the image forming device main body 11. While details of the image forming device main body 11 will be described below, the image forming device main body 11 includes a control unit 41, an image processing unit 43, an image forming portion 60, a sheet feeding portion 20, and a conveying portion 30.

Next, the automatic document feeder 14 will be described. The automatic document feeder 14 is provided above the image reading portion 12, and performs an operation to automatically feed one or a plurality of the documents T in an automatic sheet feeding mode. Here, the automatic sheet feeding mode is an operation to feed the document T placed on the automatic document feeder 14, and to read an image printed on the document T.

To be specific, the automatic document feeder 14 includes a document placing portion 141, a roller 142a, a roller 142b, a roller 143, a roller 144, an inverting portion 145, and a sheet discharging plate 146. One of a plurality of the documents T is placed on the document placing portion 141. The rollers 142a and 142b are provided at a downstream side of the document placing portion 141. The roller 143 is provided at a downstream side of the rollers 142a and 142b. Further, the automatic document feeder 14 includes a positioning detection unit 81 at an outer periphery side of the roller 143.

In a case where the automatic sheet feeding mode is selected, the document T sent out from the document placing portion 141 is rotated in a U-shape manner and conveyed by the roller 143. Note that, in a case where the document T is placed on the document placing portion 141 and the automatic sheet feeding mode is selected, a record surface of the document T favorably faces upward.

Further, the document T is conveyed by the roller 144 and is discharged to the sheet discharging plate 146 after being read in the image reading portion 12. Note that the automatic document feeder 14 can allow the image reading portion 12 to read not only the record surface of the document T but also a back surface side of the record surface of the document T by conveying the document T to the inverting portion 145.

Next, the positioning detection unit 81 will be described. The positioning detection unit 81 detects the document T on which an image is printed. The positioning detection unit 81 is configured from, for example, a reflective photo sensor. An output signal rises when the positioning detection unit 81 detects the document T, and the output signal falls when the document T becomes undetected, and a result thereof is transmitted to the control unit 41. That is, the output signal maintains a fixed value in a period in which the document T is passing through the positioning detection unit 81.

Next, the image reading portion 12 will be described. The image reading portion 12 performs an operation to read the color image formed on the document T, that is, the color image printed on the document T. The image reading portion 12 includes a one-dimensional image sensor 128. Further, the image reading portion 12 includes a first platen glass 121, a second platen glass 122, a light source 123, mirrors 124, 125, and 126, an image formation optical unit 127, and an optical drive unit (not illustrated), in addition to the image sensor 128.

The light source 123 irradiates the document T with light. The optical drive unit (not illustrated) relatively moves the document T or the image sensor 128 in a sub scanning direction. Here, the sub scanning direction is a direction perpendicular to a main scanning direction where an arranging direction of a plurality of light-receiving elements that configures the image sensor 128 is the main scanning direction.

Therefore, the document T is conveyed by the automatic document feeder 14, and an image on one surface or images on both surfaces of the document T are scanned and exposed by an optical system of the image reading portion 12. Next, incident light that reflects an image read operation is read by the image sensor 128. The image sensor 128 outputs an image read signal Sout in an RGB colorimetric system, which has been obtained by reading the document T, in a platen mode. Here, the platen mode is an operation to automatically read the image printed on the document T placed on a platen glass like the first platen glass 121 and the second platen glass 122 as the optical drive unit (not illustrated) is driven.

Next, the image sensor 128 will be specifically described. As the image sensor 128, a three-line color CCD imaging device is used. The image sensor 128 is configured such that a plurality of light-receiving element lines is arranged in the main scanning direction. To be specific, respective optical detection read sensors of red (R), green (G), and blue (B) colors divide pixels in different positions in the sub scanning direction perpendicular to the main scanning direction, and read respective pieces of optical information of the R, G, and B colors at the same time. For example, in a case where the document T is inverted in a U-shape manner by the roller 143 in the automatic sheet feeding mode, the image sensor 128 reads the surface of the document T, and outputs the image read signal Sout.

To be more specific, the image sensor 128 photoelectrically converts the incident light, and is connected to the image processing unit 43 through the control unit 41. Analog processing, A/D conversion, shading correction, image compression processing, and scale factor varying processing, and the like are executed in the image processing unit 43 for the analog image read signal Sout photoelectrically converted by the image sensor 128. As a result, the image read signal Sout becomes digital image data including an R-color component, a G-color component, and a B-color component. The image processing unit 43 converts the image data, that is, RGB codes into image data of yellow (Y), magenta (M), cyan (C), and black (K), that is, Dy, Dm, Dc, and Dk, with a three-dimensional color information conversion table. The image processing unit 43 transfers the converted image data to LED write units 611Y, 611M, 611C, and 611K included in the image forming portion 60.

Next, details of the image forming portion 60 will be described. The image forming portion 60 uses an electrophotography process technology, and forms a color image in an intermediate transfer system. For the image forming portion 60, a vertical tandem system is employed.

To be specific, the image forming portion 60 forms a color image on the basis of the image data transferred from the image processing unit 43, that is, Dy, Dm, Dc, and Dk. The image forming portion 60 includes image forming units 601Y, 601M, 601C, and 601K of the respective colors, an intermediate transfer portion 620, and a fixing unit 630 that fixes a toner image.

Next, the image forming unit 601Y will be described. The image forming unit 601Y forms a yellow (Y) image. The image forming unit 601Y includes a photosensitive drum 613Y, a charging unit 614Y, the LED write unit 611Y, a developing unit 612Y, and a cleaning unit 616Y.

The photosensitive drum 613Y forms a Y toner image. The charging unit 614Y is arranged around the photosensitive drum 613Y, and uniformly charges a surface of the photosensitive drum 613Y in a negative polarity by corona discharge. The LED write unit 611Y irradiates the photosensitive drum 613Y with light corresponding to an image of the Y-color component. The developing unit 612Y causes a toner of the Y-color component to adhere to the surface of the photosensitive drum 613Y, thereby to visualize an electrostatic latent image to form a toner image. The cleaning unit 616Y removes a transfer residual toner remaining on the surface of the photosensitive drum 613Y after primary transfer.

Note that the image forming units 601M, 601C, and 601K have similar configurations and functions to the image forming unit 601Y except that the colors of images to be formed are different. Therefore, description thereof is omitted.

In a case where the image forming units 601Y, 601M, 601C, and 601K are collectively called, these portions are called image forming units 601. Further, in a case where the LED write units 611Y, 611M, 611C, and 611K are collectively called, these units are called LED write units 611. Further, in a case where the developing units 612Y, 612M, 612C, and 612K are collectively called, these units are called developing units 612. Further, in a case where the photosensitive drums 613Y, 613M, 613C, and 613K are collectively called, these drums are called photosensitive drums 613. Further, in a case where the charging units 614Y, 614M, 614C, and 614K are collectively called, these units are called charging units 614. Further, in a case where the cleaning units 616Y, 616M, 616C, and 616K are collectively called, these units are called cleaning units 616.

Next, the intermediate transfer portion 620 will be described. The intermediate transfer portion 620 includes an intermediate transfer belt 621, primary transfer rollers 622Y, 622M, 622C, and 622K, a secondary transfer roller 623, a belt cleaning device 624, and the like.

The intermediate transfer belt 621 is configured from an endless belt, and is stretched in a loop manner by a plurality of support rollers. At least one of the plurality of support rollers is configured from a drive roller, and the others are configured from driven rollers. For example, the support roller arranged at a downstream side of the K-component primary transfer roller 622K in a belt traveling direction is favorably the drive roller. The intermediate transfer belt 621 travels at a fixed speed in an arrow mark Z direction, with rotation of the drive roller.

The primary transfer rollers 622Y, 622M, 622C, and 622K are arranged at an inner peripheral surface side of the intermediate transfer belt 621 to face the photosensitive drums 613 of the respective color components. The primary transfer rollers 622Y, 622M, 622C, and 622K are pressed against the photosensitive drums 613Y, 613M, 613C, and 613K across the intermediate transfer belt 621. Accordingly, a primary transfer nip for transferring toner images from the photosensitive drums 613Y, 613M, 613C, to 613K to the intermediate transfer belt 621 is formed.

In a case where the primary transfer rollers 622Y, 622M, 622C, and 622K are collectively called, these rollers are called primary transfer rollers 622.

The secondary transfer roller 623 is arranged at an outer peripheral surface side of the intermediate transfer belt 621 to face one of the plurality of support rollers. The support roller arranged to face the intermediate transfer belt 621 is called backup roller. The secondary transfer roller 623 is pressed against the backup roller across the intermediate transfer belt 621, so that a secondary transfer nip for transferring the toner image from the intermediate transfer belt 621 to the sheet P is formed.

When the intermediate transfer belt 621 passes through the primary transfer nip, the toner images on the photosensitive drums 613 are primarily transferred to the intermediate transfer belt 621 sequentially in a layered manner. To be specific, a primary transfer bias is applied to the primary transfer rollers 622, and a charge in a reverse polarity to the toners is provided to a back surface side of the intermediate transfer belt 621, that is, to a side coming in contact with the primary transfer rollers 622, so that the toner images are electrostatically transferred to the intermediate transfer belt 621.

Following that, when the sheet P passes through the secondary transfer nip, the toner image on the intermediate transfer belt 621 is secondarily transferred to the sheet P. To be specific, a secondary transfer bias is applied to the secondary transfer roller 623, and a charge in a reverse polarity to the toner is provided to a back surface side of the sheet P, that is, to a side coming in contact with the secondary transfer roller 623, so that the toner image is electrostatically transferred to the sheet P. The sheet P to which the toner image is transferred is conveyed toward the fixing unit 630.

The belt cleaning device 624 includes a belt cleaning blade being slidingly in contact with the surface of the intermediate transfer belt 621, and the like. The belt cleaning device 624 removes the transfer residual toner remaining on the surface of the intermediate transfer belt 621 after the secondary transfer.

Note that, in the intermediate transfer portion 620, a configuration in which a secondary transfer belt (not illustrated) is stretched over a plurality of support rollers including the secondary transfer roller 623 in a loop manner, so called, a belt-type secondary transfer unit may be employed in place of the secondary transfer roller 623.

Next, the fixing unit 630 will be described. The fixing unit 630 includes a heating roller 631, a pressure roller 632, a heating unit 633, and a temperature detection unit 83, and fixes the toner image transferred in the image forming portion 60 to the sheet P.

To be specific, the heating unit 633 is provided inside the heating roller 631, and intermittently heats the heating roller 631. The pressure roller 632 is arranged to face the heating roller 631, and pressurizes the heating roller 631. The temperature detection unit 83 is provided in a periphery of the heating roller 631, and detects the temperature of the heating roller 631. A sampling period of the temperature detection unit 83 is, for example, 100 ms.

In the fixing unit 630, the heating unit 633 heats the heating roller 631 according to a detection result of the temperature detection unit 83 that detects the temperature of the heating roller 631. The fixing unit 630 causes the heating roller 631 and the pressure roller 632 to press against each other to form a fixing nip between the heating roller 631 and the pressure roller 632.

The fixing unit 630 fixes the transferred toner image to the sheet P through an action of the pressurization by the pressure roller 632 and the heat held by the heating roller 631. An image is printed on the sheet P fixed by the fixing unit 630. The sheet P on which the image has been printed is discharged outside the device by the sheet discharging roller 304, and is conveyed to the image reading device 7, for example. Note that the sheet P on which the image is printed may be loaded on the sheet discharging tray 305 without being conveyed to the image reading device 7.

Next, the sheet feeding portion 20 will be described. The sheet feeding portion 20 includes a sheet feeding cassette 200, a send-out roller 201, and the like. The sheet feeding cassette 200 accommodates the sheet P. The send-out roller 201 takes in the sheet P accommodated in the sheet feeding cassette 200, and sends out the sheet P to the conveying portion 30.

Next, the conveying portion 30 will be described. In the conveying portion 30, a conveying path 300 is configured, and the conveying portion 30 conveys the sheet P in accordance with the conveying path 300. The conveying path 300 includes a sheet feeding roller 302A, conveying rollers 302B, 302C, and 302D, a resist roller 303, and the like.

The conveying path 300 conveys the sheet P fed from the sheet feeding portion 20 to the image forming portion 60. In a case where an image is formed on the back surface of the sheet P, the sheet P is conveyed to a circulation sheet passage 307A, an inverting conveying passage 307B, and a re-feed conveying passage 307C in order by a branch unit 306 after the image formation to the surface of the sheet P is performed.

Next, a control system will be described. In the image forming device 5, various types of processing are executed through the control unit 41. For example, the image read signal Sout output from the image reading portion 12 is transmitted to an image memory (not illustrated) or the image processing unit 43 through the control unit 41. The image memory is made of, for example, a hard disk.

The control unit 41 is mainly configured from, to be specific, a CPU, a ROM, a RAM, and an I/O interface (not illustrated). In the control unit 41, the CPU reads various programs according to processing content from the ROM or a storage unit (not illustrated), develops the programs on the RAM, and is operated in conjunction with the developed various programs, thereby to control operations of respective units of the image forming device 5.

That is, the control unit 41 controls the operation of the image forming device 5, and can be realized with a microcomputer mainly configured from the CPU, the ROM, the RAM, and the I/O interface (not illustrated). When the control unit 41 executes a predetermined control program, various functions are realized.

Figure 3:
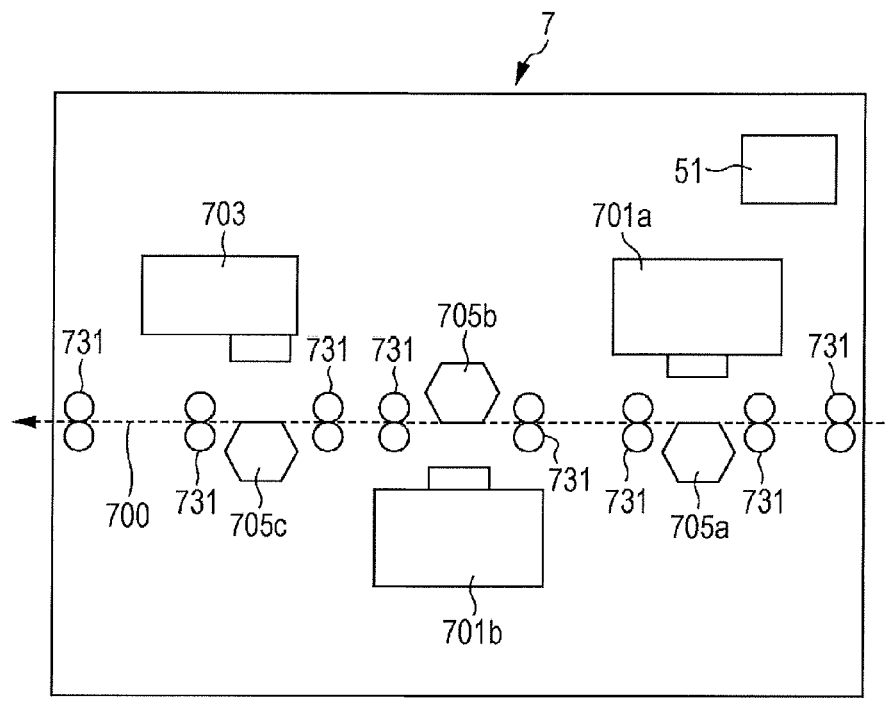
FIG. 3 is a diagram illustrating a configuration example of an image reading device in the first embodiment of the present invention.
Figure 4:
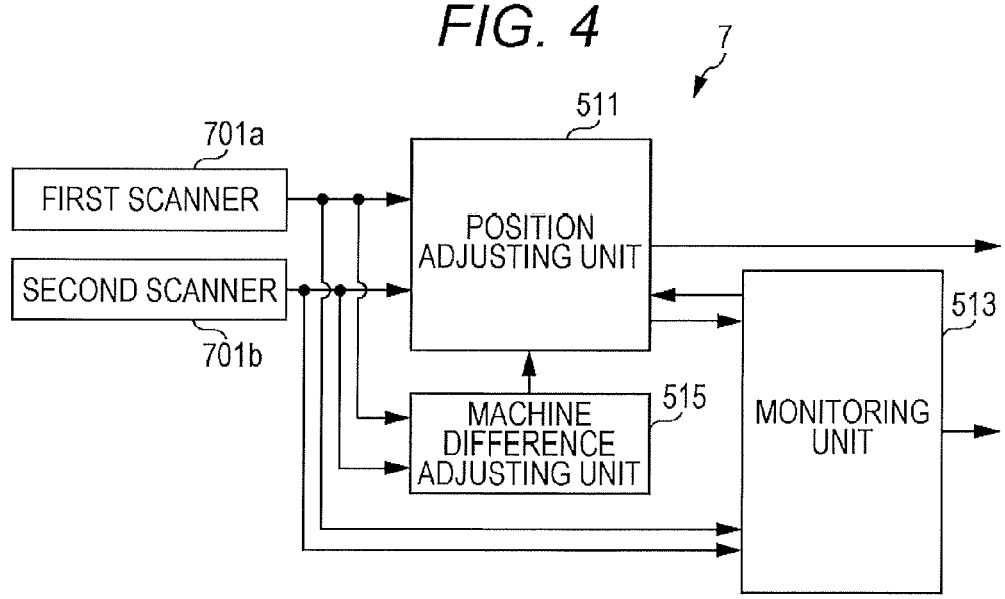
FIG. 4 is a diagram illustrating a function configuration example of a control unit in the first embodiment of the present invention.

Next, the image reading device 7 will be specifically described. FIG. 3 is a diagram illustrating a configuration example of the image reading device 7 in the first embodiment of the present invention. FIG. 4 is a diagram illustrating a function configuration example of a control unit 51 in the first embodiment of the present invention.

The image reading device 7 is arranged at a downstream side of the image forming device 5, and reads an image printed on one surface or images printed on both surfaces of the sheet P. The image reading device 7 obtains a correction amount of the image on the basis of read results of a color, a position, a scale factor, and the like of the image printed on the sheet P, and feeds back the obtained correction amount of the image to the image forming device 5.

The image reading device 7 includes the control unit 51, a first scanner 701a, a second scanner 701b, a colorimeter 703, proofread units 705a to 705c, a conveying roller 731, and a conveying path 700. The conveying path 700 is a path that allows the sheet P supplied from the image forming device 5 to pass, and on which the sheet P is conveyed by driving of the conveying roller 731.

The image reading device 7 causes the first scanner 701a, the second scanner 701b, or the colorimeter 703 to detect the image formed on the sheet P upon receiving the sheet P supplied from the image forming device 5, for example. A detection result of the image is output to the control unit 51 of the image reading device 7.

The control unit 51 controls an operation of the image reading device 7, and can be realized with a microcomputer mainly configured from a CPU, a ROM, a RAM, and an I/O interface (not illustrated). When the control unit 41 executes a predetermined control program, various functions including a position adjusting unit 511, a monitoring unit 513, and a machine difference adjusting unit 515 are realized, as illustrated in FIG. 4. Note that the control unit 51 executes various types of processing on the basis of the detection result of the image, and transmits execution results to the control unit 41 of the image forming device 5.

The position adjusting unit 511 adjusts front and back positions of a mark A on the basis of a print position of the mark A read by at least one of the first scanner 701a and the second scanner 701b. Here, the mark A formed on the sheet P will be described.

Figure 5:
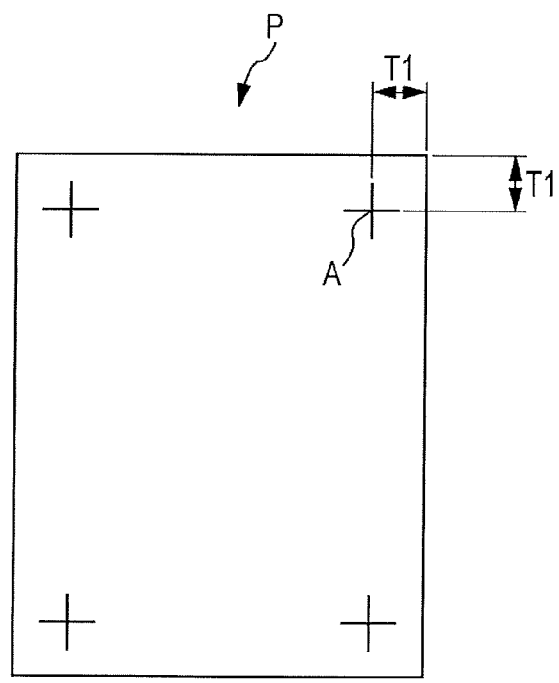
FIG. 5 is a diagram illustrating an example of a mark formed on a sheet in the first embodiment of the present invention.

FIG. 5 is a diagram illustrating an example of the mark A formed on the sheet P in the first embodiment of the present invention. As illustrated in FIG. 5, the mark A is cross lines, and is used for detection of front and back misregistration. The mark A is formed in a position separated from a corner of the sheet P by T1 in vertical and horizontal directions. Since the sheet P has four corners, four marks A are formed. However, the marks A are not necessarily formed at all of the corners, and it is sufficient if the front and back misregistration can be detected with the mark A. Further, the mark A may not be the cross lines.

Referring back to FIG. 4. The monitoring unit 513 monitors the front and back misregistration of the mark A on the basis of front and back positions of the mark A adjusted by the position adjusting unit 511. The machine difference adjusting unit 515 adjusts a machine difference between the first scanner 701a and the second scanner 701b on the basis of a print position of the mark A read by the first scanner 701a and a print position of the mark A read by the second scanner 701b.

The position adjusting unit 511 determines an adjustment reference position of the mark A, which serves as a reference of monitoring of the front and back misregistration of the mark A by the monitoring unit 513, in a case where the machine difference between the first scanner 701a and the second scanner 701b has been adjusted by the machine difference adjusting unit 515.

The first scanner 701a and the second scanner 701b are arranged to face the sheet P that passes on the conveying path 700, and reads the image printed on the sheet P. The first scanner 701a reads the back surface of the sheet P, and a read result is used for check of front and back misregistration of the images printed on the sheet P, and check for existence/non-existence of an unexpected image. Meanwhile, the second scanner 701b reads the surface of the sheet P, and performs a read operation of the image printed on the sheet P, for example, a patch (not illustrated). In a case where the first scanner 701a and the second scanner 701b are not especially distinguished, the first scanner 701a and the second scanner 701b are called scanners 701.

Note that the operation of the image reading device 7 is executed in either an in-line system or an off-line system.

The in-line system is configured to directly feed the sheet P on which the image is formed and supplied from the image forming device 5 to the image reading device 7. Meanwhile, the off-line system is not configured to directly feed the sheet P on which the image is formed and supplied from the image forming device 5 to the image reading device 7, and is a system in which the image forming device 5 and the image reading device 7 are independently configured. Here, the description is given on the basis of the in-line system. However, the system may be the off-line system.

The colorimeter 703 is at a downstream side of the scanners 701, and is arranged in a position facing the sheet P passing on the conveying path 700. The colorimeter 703 guarantees an absolute value of the color of the image to be formed on the sheet P by measuring the color of the patch, of the image formed on the sheet P, for example.

To be specific, the colorimeter 703 irradiates the patch with visible light from a visible light source (not illustrated), and acquires optical spectrum of reflected light of the visible light reflected by the proofread unit 705c, and calculation to a predetermined colorimetric system is executed on the basis of the acquired optical spectrum, and the tone of the patch is drawn.

The result of the colorimetry of the patch is generated as numerical data expressed in the predetermined colorimetric system, for example, Lab color space data or XYZ color space data, that is, as a colorimetric value, and is output to the control unit 51 or the control unit 41.

Note that a colorimetric range, that is, a viewing angle, of the colorimeter 703, is set to be narrower than read ranges of the scanners 701, and to be narrower than a width of the patch along a sheet width direction. To be specific, a lens unit that acquires the reflected light of the patch is about 4 mm, for example.

As described above, the colorimeter 703 performs the colorimetry in a limited fixed viewing angle range. Therefore, color information can be reproduced with higher accuracy than the scanners 701.

Note that the control unit 51 corrects the color information of the patch read by the scanners 701 on the basis of the colorimetric value of the patch measured in the colorimeter 703. To be specific, the control unit 51 associates the color information of the patch measured in the colorimeter 703 and the color information of the patch read by the scanners 701. If the color information of the patch by the colorimeter 703 and the color information of the patch by the scanners 701 are associated, the colorimetry result of the colorimeter 703 can be reflected to the read results of the scanners 701, and an accurate correction amount can be obtained.

The image processing unit 43 optimizes the image to be formed by the image forming portion 60 on the basis of the correction amount calculated in the control unit 51. The optimization processing of the image executed by the image processing unit 43 includes front and back positions adjustment, density adjustment, tone adjustment, and the like of the image to be printed on the sheet P.

That is, the image processing unit 43 corrects the color, the position, or the scale factor of the image to be formed on the sheet P according to the read result of the sheet P by the image reading device 7. To be specific, the image processing unit 43 corrects the image to be formed on the sheet P on the basis of the corrected color information. The image processing unit 43 outputs a command to form the image on the sheet P, to the image forming portion 60 on the basis of a correction result.

Note that the proofread units 705a and 705b are arranged in positions facing the scanners 701, and reflect light with which the sheet P is irradiated at the time of reading the image.

Figure 6:
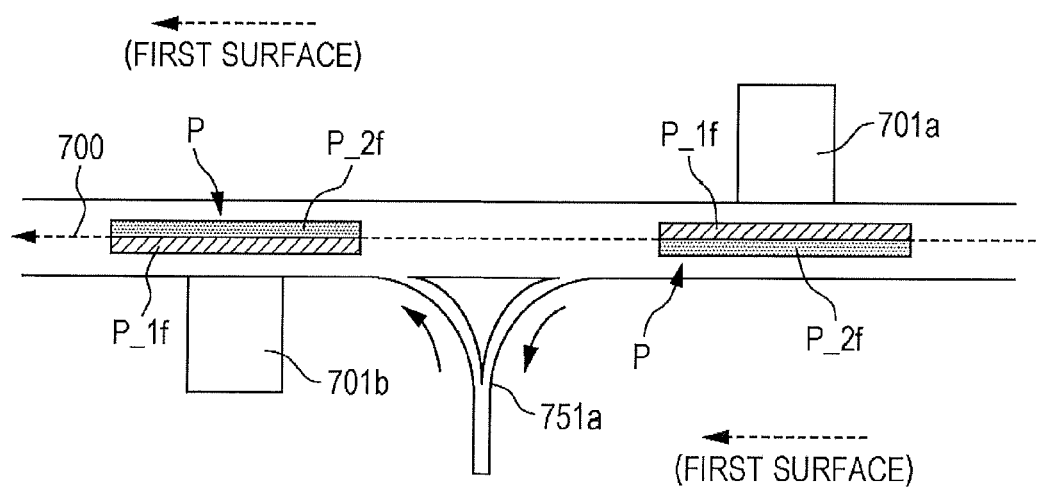
FIG. 6 is a diagram illustrating an example in which the same sheet is conveyed on a conveying path of the sheet in the first embodiment of the present invention.

Next, the conveying path 700 will be specifically described. FIG. 6 is a diagram illustrating an example in which the same sheet P is conveyed on the conveying path 700 of the sheet P in the first embodiment of the present invention. As illustrated in FIG. 6, an inverting path 751a is provided between the first scanner 701a and the second scanner 701b along the conveying path 700. The inverting path 751a inverts the sheet P read by the first scanner 701a at an upstream side, and conveys the sheet P to the second scanner 701*b* at a downstream side.

Therefore, if the sheet P passes through the inverting path 751*a*, the first scanner 701*a* reads a first surface P_1*f* of the sheet P, and the second scanner 701*b* can read the first surface P_1*f* of the sheet P.

Therefore, the conveying path 700 of FIG. 6 can allow the first scanner 701*a* and the second scanner 701*b* to read the mark A formed on the same surface of the same sheet P.

Further, if the sheet P does not pass through the inverting path 751*a*, the first scanner 701*a* reads the first surface P_1*f* of the sheet P, and the second scanner 701*b* can read a second surface P_2*f* of the sheet P.

Therefore, the conveying path 700 of FIG. 6 can allow the first scanner 701*a* and the second scanner 701*b* to read the mark A formed on different surfaces of the sheet P.

Note that the first surface P_1*f* of the sheet P means one of the surface and the back surface of the sheet P, and the second surface P_2*f* of the sheet P means the other of the surface and the back surface of the sheet P. The same applied to the description below.

On the conveying path 700 of FIG. 6, the machine difference adjusting unit 515 adjusts the machine difference between the scanners 701 on the basis of the mark A formed on the same surface of the sheet P. Further, on the conveying path 700 of FIG. 6, the monitoring unit 513 monitors, in monitoring the front and back misregistration of the mark A formed on the sheet P, a first adjustment reference misregistration amount between a first adjustment reference position of the mark A formed on the first surface P_1*f* of the sheet P, of the adjustment reference positions of the mark A determined by the position adjusting unit 511, and the print position of the mark A formed on the first surface P_1*f* of the sheet P read by the first scanner 701*a*. Further, on the conveying path 700 of FIG. 6, the monitoring unit 513 monitors, in monitoring the front and back misregistration of the mark A formed on the sheet P, a second adjustment reference misregistration amount between a second adjustment reference position of the mark A formed on the second surface P_2*f* of the sheet P, of the adjustment reference positions of the mark A determined by the position adjusting unit 511, and the print position of the mark A formed on the second surface P_2*f* of the sheet P read by the second scanner 701*b*.

Further, on the conveying path 700 of FIG. 6, the position adjusting unit 511 adjusts the front and back positions of the mark A on the basis of the first adjustment reference misregistration amount monitored by the monitoring unit 513, and the second adjustment reference misregistration amount monitored by the monitoring unit 513.

Note that specific adjustment processing of the adjustment of the front and back positions of the mark A is not limited as long as the front and back positions of the mark A are adjusted as a consequence. For example, read times of the scanners 701 may be adjusted, and a correction amount based on adjustment results may be fed back to the image forming device 5. Further, for example, the correction amount based on the read results of the scanners 701 may be fed back to the image forming device 5, and the image forming device 5 may actually adjust the print position of the mark A in forming the mark A on the sheet P.

Figure 7:
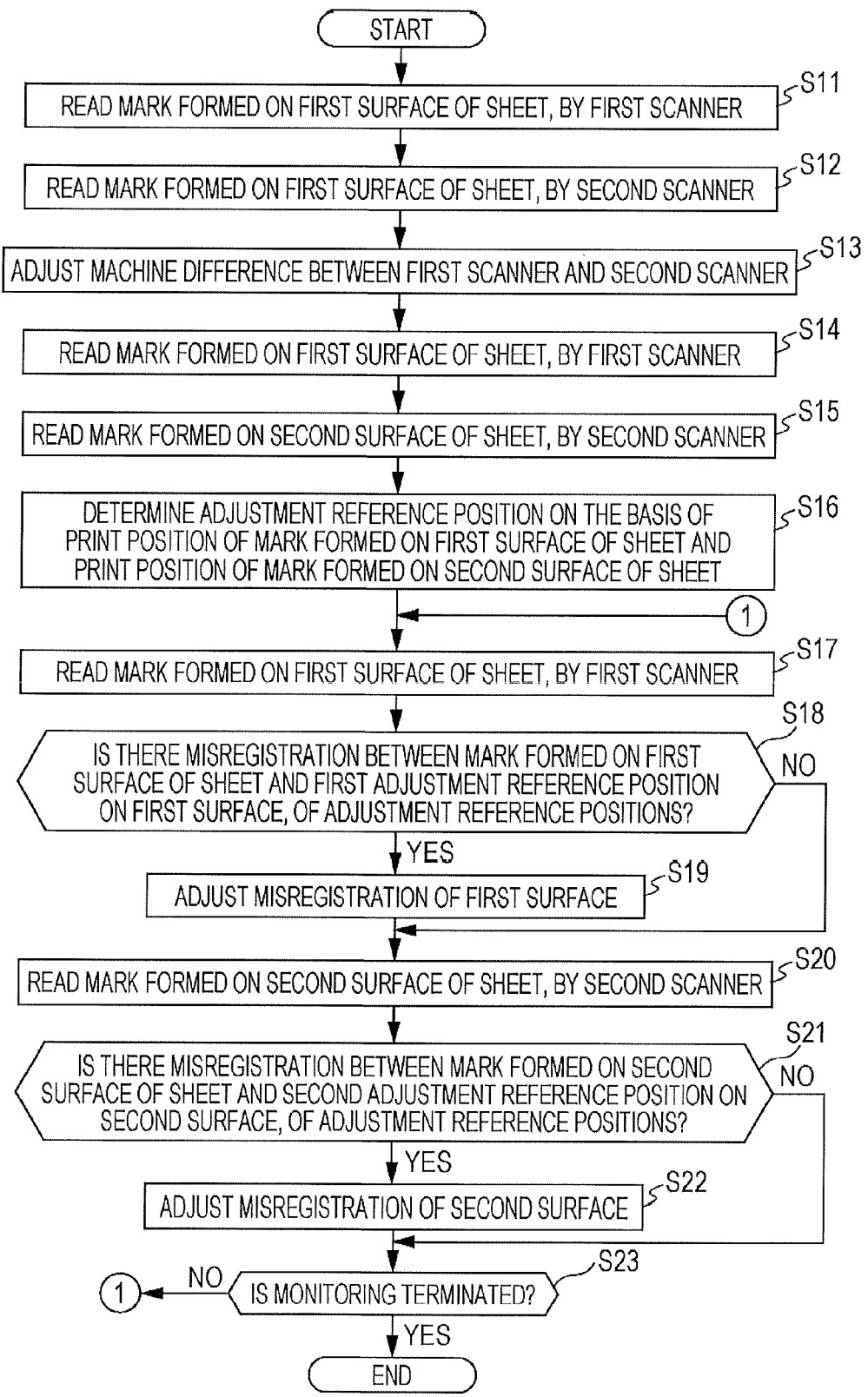
FIG. 7 is a flowchart for describing a control example in the first embodiment of the present invention.

Next, a control example of the control unit 51 on the conveying path 700 of FIG. 6 will be described. FIG. 7 is a flowchart for describing a control example in the first embodiment of the present invention.

In step S11, the first scanner 701*a* reads the mark A formed on the first surface P if of the sheet P. In step S12, the second scanner 701*b* reads the mark A formed on the first surface P_1*f* of the sheet P. In step S13, the machine difference between the first scanner 701*a* and the second scanner 701*b* is adjusted.

The processing of steps S11 to S13 above is machine difference adjustment processing.

In step S14, the first scanner 701*a* reads the mark A formed on the first surface P_1*f* of the sheet P. In step S15, the second scanner 701*b* reads the mark A formed on the second surface P_2*f* of the sheet P. In step S16, the adjustment reference position is determined on the basis of the print position of the mark A formed on the first surface P_1*f* of the sheet P and the print position of the mark A formed on the second surface P_2*f* of the sheet P.

The processing of steps S14 to S16 above is processing of determining the adjustment reference position in monitoring the front and back misregistration of the sheet P.

In step S17, the first scanner 701*a* reads the mark A formed on the first surface P_1*f* of the sheet P. In step S18, whether there is misregistration between the mark A formed on the first surface P_1*f* of the sheet P, and the first adjustment reference position on the first surface P_1*f*, of the adjustment reference positions, is determined. When it is determined that there is misregistration between the mark A formed on the first surface P_1*f* of the sheet P, and the first adjustment reference position on the first surface P_1*f*, of the adjustment reference positions, the processing proceeds to step S19. In step S19, the misregistration on the first surface P_1*f* is adjusted, and the processing proceeds to step S20. Meanwhile, when it is determined that there is no misregistration between the mark A formed on the first surface P_1*f* of the sheet P, and the first adjustment reference position on the first surface P_1*f*, of the adjustment reference positions, the processing proceeds to step S20.

In step S20, the second scanner 701*b* reads the mark A formed on the second surface P_2*f* of the sheet P. In step S21, whether there is misregistration between the mark A formed on the second surface P_2*f* of the sheet P, and the second adjustment reference position on the second surface P_2*f*, of the adjustment reference positions, is determined. When it is determined that there is misregistration between the mark A formed on the second surface P_2*f* of the sheet P, and the second adjustment reference position on the second surface P_2*f*, of the adjustment reference positions, the processing proceeds to step S22. In step S22, the misregistration on the second surface P_2*f* is adjusted, and the processing proceeds to step S23. Meanwhile, when it is determined that there is no misregistration between the mark A formed on the second surface P_2*f* of the sheet P, and the second adjustment reference position on the second surface P_2*f*, of the adjustment reference positions, the processing proceeds to step S23.

In step S23, whether the monitoring is to be terminated is determined. When it is determined that the monitoring is to be terminated, the processing is terminated. Meanwhile, when it is determined that the monitoring is not to be terminated, the processing returns to step S17.

The processing of steps S17 to S23 above is monitoring processing and position adjustment processing.

There are conditions that influence occurrence of the front and back misregistration of printing. The first condition is an environment condition, and is temperature and humidity in a print location. To be specific, there are a high-temperature and high-humidity environment, a low-temperature and low-humidity environment, and a common environment. In the high-temperature and high-humidity environment, the water content of the sheet P is easily increased, and print misregistration is more likely to occur. In the low-temperature and low-humidity environment, the sheet P easily slips, and the print misregistration is more likely to occur. In the common environment, the sheet P is stable, and the print misregistration is less likely to occur.

Note that, in the description below, the high-temperature and high-humidity environment is called HH environment, the low-temperature and low-humidity environment is called LL environment, and the common environment is called NN environment.

The second condition is the sheet P to be printed. Among the sheets P, there are a high-basis weight paper, a large-size paper, a thick paper, and the like. The high-basis weight paper is a paper having a large basis weight and is often a thick sheet P, the water content easily changes, and the print misregistration is more likely to occur. The large-size paper has a large print image, and thus the print misregistration due to the print scale factor is more likely to occur. The thick paper is a paper having thickness for the basis weight, the water content easily changes, and the print misregistration is more likely to occur.

The third condition is deterioration of mechanical durability of a printer main body. For example, if the units of the image forming device 5 are mechanically deteriorated due to a long period of use, the print misregistration is more likely to occur.

Further, the period of monitoring of the front and back positions is set according to the environmental condition or by a user. For example, in a case of performing printing in the HH environment or in the LL environment, or printing on the thick sheet P, it is favorable to perform monitoring for every copy. That is, this is monitoring in a short period and this is a case where easy occurrence of sudden front and back misregistration is expected Further, for example, in a case where mechanical abrasion of the printer main body becomes intensive, it is favorable to perform monitoring in every six hours. That is, this is monitoring in a middle period and this is a case where a possibility of occurrence of sudden front and back misregistration is expected.

Further, for example, in a case of performing printing in the NN environment, or printing on a standard recommended sheet, it is favorable to perform monitoring once a day in the morning. This is monitoring in a long period, and this is a case where the sudden front and back misregistration being less likely to occur is expected.

Figure 8:
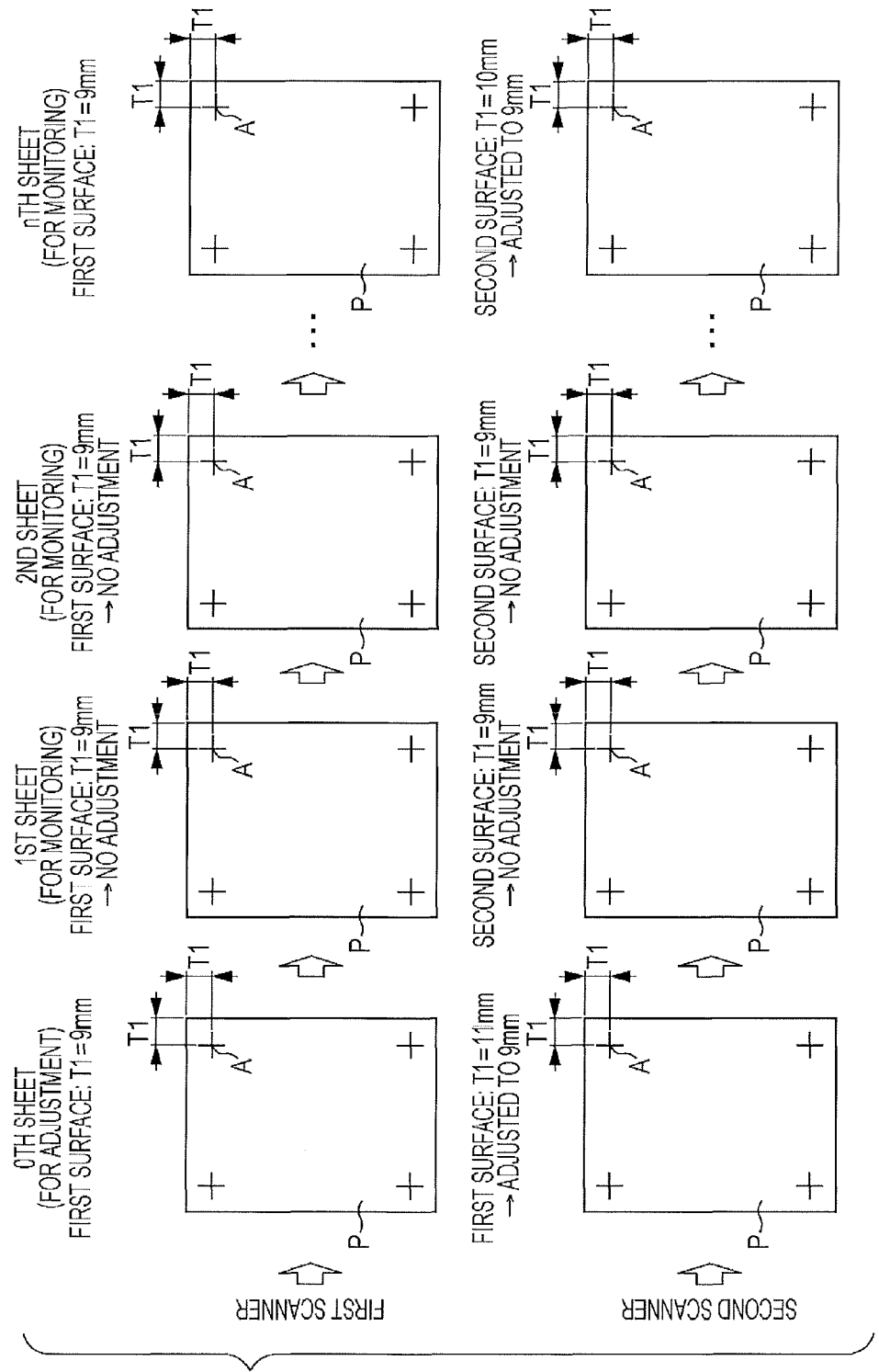
FIG. 8 is a diagram illustrating an adjustment example of front and back positions of the mark in the first embodiment of the present invention.

Next, the machine difference adjustment and the front and back misregistration adjustment will be specifically described. FIG. 8 is a diagram illustrating an adjustment example of front and back positions of a mark A in the first embodiment of the present invention. The 0th sheet of FIG. 8 corresponds to the sheet P for the machine difference adjustment performed before the monitoring, and the 1st and subsequent sheets correspond to the sheets P for monitoring performed after the machine difference adjustment.

To be specific, in the 0th sheet, the machine difference adjustment of the scanners 701, which is performed before monitoring the front and back misregistration of the mark A formed on the sheet P is conducted. For example, the print position of the mark A on the first surface P_1f read by the second scanner 701b is adjusted in accordance with the print position of the mark A read by the first scanner 701a.

Further, in the 1st sheet, the processing of determining the adjustment reference position to be used for the monitoring is conducted. In the 2nd and subsequent sheets, the front and back misregistration of the mark A is monitored on the basis of the adjustment reference position determined in the 1st sheet. For example, in the nth sheet, the print position of the mark A on the second surface P_2f read by the second scanner 701b is adjusted in accordance with the second adjustment reference position determined in the 1st sheet.

Note that, even if the print position of the mark A is matched with a design value, when the adjustment reference position is determined in the 1st sheet, adjustment is performed such that no difference occurs between the print position of the mark A and the adjustment reference position determined in the 1st sheet.

Figure 9:
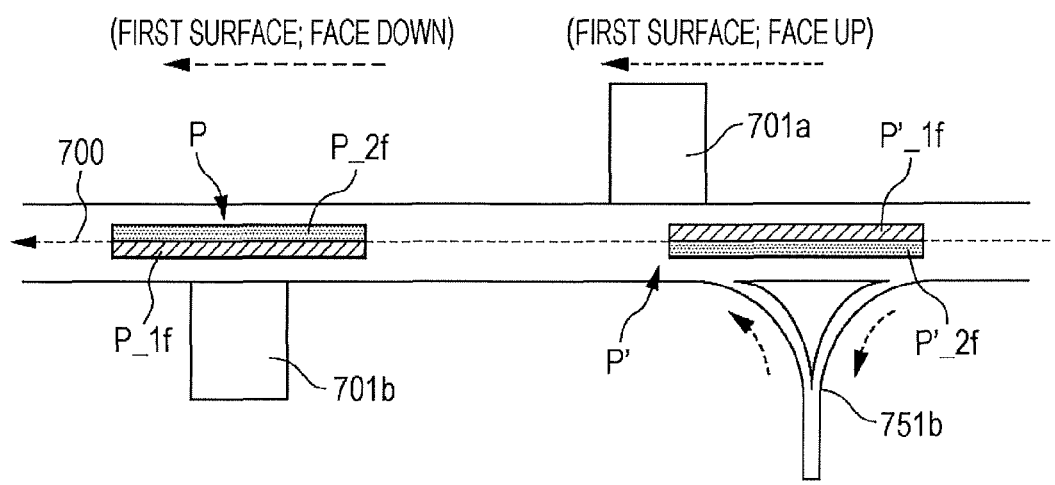
FIG. 9 is a diagram illustrating an example in which different sheets are conveyed on the conveying path of the sheet in the first embodiment of the present invention.

In a case of the inverting path 751a provided in the conveying path 700 of FIG. 6, the same sheet P is read by the scanners 701. However, an embodiment is not limited thereto. FIG. 9 is a diagram illustrating an example in which different sheets P are conveyed on the conveying path 700 of the sheet P in the first embodiment of the present invention.

The conveying path 700 of FIG. 9 is provided with an inverting path 751b at an upstream side of the first scanner 701a. Therefore, the inverting path 751b of FIG. 9 allows the first scanner 701a to read a sheet P' with a face-up first surface P'_1f, and allows the second scanner 701b to read the sheet P with a face-down first surface P_1f. Accordingly, the inverting path 751b of FIG. 9 can allow the scanners 701 to read the same surfaces of the different sheets P and P', that is, the first surface P_1f and the first surface P'_1f. In a case where the inverting paths 751a and 751b are not distinguished, these inverting paths are called inverting paths 751.

As described above, the image reading device 7 adjusts the front and back positions of the mark A on the basis of the print positions of the mark A respectively formed on the front and back of the sheet P read by at least one of the first scanner 701a and the second scanner 701b.

For example, if the front and back positions of the mark A are adjusted on the basis of the print position of the mark A read by the first scanner 701a, the front and back misregistration of the mark A caused by the single first scanner 701a is adjusted. Further, for example, if the front and back positions of the mark A are adjusted on the basis of the print position of the mark A read by the second scanner 701b, the front and back misregistration of the mark A caused by the single second scanner 701b is adjusted. Further, for example, if the front and back positions of the mark A are adjusted on the basis of the print positions of the mark A respectively read by the first scanner 701a and the second scanner 701b, the front and back misregistration of the mark A caused by the machine difference between the scanners 701 is adjusted.

Further, the image reading device 7 monitors the front and back misregistration of the mark A on the basis of the adjusted front and back positions of the mark A. For example, if the image reading device 7 performs the monitoring using, as a reference, the front and back positions of the mark A adjusted on the basis of the read result of the first scanner 701a, the image reading device 7 can monitor the front and back misregistration of the mark A without being affected by the machine difference, even if there is the machine difference between the first scanner 701a and the second scanner 701b.

Further, for example, if the image reading device 7 performs the monitoring using, as a reference, the front and back positions of the mark A adjusted on the basis of the read result of the second scanner 701b, the image reading device 7 can monitor the front and back misregistration of the mark A without being affected by the machine difference, even if there is the machine difference between the second scanner 701b and the first scanner 701a.

Further, for example, if the image reading device 7 performs the monitoring using, as a reference, the front and back positions of the mark A adjusted on the basis of the respective read results of the first scanner 701a and the second scanner 701b, the image reading device 7 can monitor the front and back misregistration of the mark A in a state where the machine difference between the first scanner 701a and the second scanner 701b has been adjusted.

In any case, the influence of the machine difference between the scanners 701 can be eliminated without mechanical adjustment.

Further, the front and back misregistration of the mark A can be detected, and thus the front and back misregistration of images formed using the mark A as a reference can be detected. The front and back misregistration of the mark A as a detection target is more simple and limited than the case of detecting only the front and back misregistration of images, and thus can be easily detected without missing the target. Therefore, the sudden front and back misregistration of the images can be easily detected.

In other words, the image reading device 7 adjusts the front and back positions of the mark A on the basis of the print positions of the mark A respectively formed on the front and back of the sheet P read by at least one of the first scanner 701a and the second scanner 701b, and monitors the front and back misregistration of the mark A on the basis of the adjusted front and back positions of the mark A, thereby to eliminate the influence of the machine difference between the scanners 701 without mechanical adjustment, and to detect the front and back misregistration of the mark A. Therefore, the sudden front and back misregistration of images can be easily detected while the front and back positions of images formed on the sheet P are accurately read.

Further, in the image reading device 7, in a case where the machine difference between the first scanner 701a and the second scanner 701b has been adjusted on the basis of the print position of the mark A read by the first scanner 701a and the print position of the mark A read by the second scanner 701b, the adjustment reference position of the mark A serving as a reference of monitoring of the front and back misregistration of the mark A is determined, and the adjustment reference position of the mark A becomes the reference in a state where the machine difference between the scanners 701 has been adjusted. Therefore, the front and back misregistration of the mark A can be monitored using both of the first scanner 701a and the second scanner 701b. Therefore, the mark A formed on the front and back of the sheet P can be monitored at the same time in one-time conveyance. Therefore, if there is the front and back misregistration of the mark A, the time required to detect the front and back misregistration of the mark A can be shortened, compared with the case of conveying the sheet P twice with the one scanner 701.

Further, in the image reading device 7, the machine difference between the scanners 701 is adjusted on the basis of the mark A formed on the same surface of the sheet P, so that the same comparison objects are compared because the mark A to be read by the scanners 701 is formed on the same surface, and the machine difference between the scanners 701 can be accurately detected.

Further, in the image reading device 7, the first adjustment reference misregistration amount between the print position of the mark A formed on the first surface P_1f of the sheet P read by the first scanner 701a, and the adjustment reference position of the mark A formed on the first surface P_1f of the sheet P is monitored, the second adjustment reference misregistration amount between the print position of the mark A formed on the second surface P_2f of the sheet P read by the second scanner 701b, and the adjustment reference position of the mark A formed on the second surface P_2f of the sheet P is monitored, and the front and back positions of the mark A are adjusted on the basis of the first adjustment reference misregistration amount and the second adjustment reference misregistration amount.

Therefore, the front and back positions of the mark A are adjusted on the basis of the relative front and back misregistration of the mark A, and thus the front and back misregistration of the mark A can be monitored at low cost.

As described above, according to the present embodiment, the front and back misregistration of the mark A can be monitored without being affected by the machine difference between the scanners 701. Therefore, highly accurate component accuracy and highly accurate attaching position accuracy, which are required in mechanically adjusting the component accuracy and the attaching position accuracy, are not required. Therefore, the image forming system 1 can be formed at low cost.

Note that the machine difference between the scanners 701 is caused by various causes such as lens individual difference, variation in lens attaching positions, or variation in attaching positions of the scanners 701. Especially, the lens individual difference is based on lens distortion, and a gap of a scale factor or a partial scale factor in a read main scanning direction is caused. Therefore, detection of the front and back misregistration of the mark A without being affected by the machine difference between the scanners 701 contributes to a significant decrease in cost as the entire system, in building the image forming system 1.

Further, in the image forming device 5, the front and back misregistration of the mark A, or the image misregistration caused by the front and back misregistration of the mark A may be caused, even though print setting is unchanged, as duplex printing advances. Such misregistration is caused due to the environmental condition such as the temperature and humidity in the print location or the deterioration of mechanical durability, and is therefore suddenly caused. Therefore, conventionally measurement of the front and back positions of the mark A is conducted in every fixed time. However, side effects are caused due to the frequency of the measurement of the front and back positions of the mark A.

For example, if the frequency of the measurement of the front and back positions of the mark A is increased, productivity is decreased as the entire system because a longer time is required although the front and back misregistration of the mark A can be detected early. Meanwhile, if the frequency of the measurement of the front and back positions of the mark A is decreased, the front and back misregistration of the mark A may not be able to be detected although the time can be spent for production. A printed output matter without detecting the front and back misregistration of the mark A goes to waste, resulting in an increase in cost.

Therefore, if the front and back misregistration of the mark A is monitored, like the present embodiment, the sudden front and back misregistration of the mark A due to change of the environment condition can be easily detected. Therefore, the cost can be decreased as the entire system.

In other words, the image forming system 1 includes the image reading device 7 and the image forming device 5, thereby to easily detect the sudden front and back misregistration of images formed on the sheet P while accurately reading the front and back positions of the images at low cost, similarly to the case of the image reading device 7.

Further, the image forming system 1 can easily detect the front and back misregistration of an output matter of the image forming device 5 at low cost by the image reading device 7, and thus can provide a low-cost feedback system as the entire system.

As described above, according to the image reading device 7 of the present embodiment, the image reading device 7 in which the mark A is formed on the front and back of the sheet P by the image forming device 5, and including the first scanner 701*a* that reads the mark A, and the second scanner 701*b* provided at a downstream side of the first scanner 701*a*, and which reads the mark A, includes the position adjusting unit 511 that adjusts the front and back positions of the mark A on the basis of the print position of the mark A read by at least one of the first scanner 701*a* and the second scanner 701*b*, and the monitoring unit 513 that monitors the front and back misregistration of the mark A on the basis of the front and back positions of the mark A adjusted by the position adjusting unit 511.

Accordingly, the sudden front and back misregistration of the images can be easily detected while the front and back positions of the images formed on the sheet P are accurately read at low cost.

Further, according to the image reading device 7 of the present embodiment, the machine difference adjusting unit 515 that adjusts the machine difference between the first scanner 701*a* and the second scanner 701*b* on the basis of the print position of the mark A read by the first scanner 701*a* and the print position of the mark A read by the second scanner 701*b* is further included, and the position adjusting unit 511 determines the adjustment reference position of the mark A, which serves as a reference of monitoring of the front and back misregistration of the mark A by the monitoring unit 513, in a case where the machine difference has been adjusted by the machine difference adjusting unit 515.

Accordingly, the image reading device 7 can shorten the time required to detect the front and back misregistration of the mark A, compared with a case in which the sheet P is conveyed twice with one scanner 701, if there is the front and back misregistration of the mark A.

Further, according to the image reading device 7 of the present embodiment, the machine difference adjusting unit 515 adjusts the machine difference on the basis of the mark A formed on the same surface of the sheet P.

Accordingly, the image reading device 7 can accurately detect the machine difference between the scanners 701.

Further, according to the image reading device 7 of the present embodiment, in monitoring the front and back misregistration of the mark A formed on the sheet P, the monitoring unit 513 monitors the first adjustment reference misregistration amount between the first adjustment reference position of the mark A formed on the first surface P_1*f* of the sheet P, of the adjustment reference positions of the mark A determined by the position adjusting unit 511, and the print position of the mark A formed on the first surface P_1*f* of the sheet P read by the first scanner 701*a*, and monitors the second adjustment reference misregistration amount between the second adjustment reference position of the mark A formed on the second surface P_2*f* of the sheet P, of the adjustment reference positions of the mark A determined by the position adjusting unit 511, and the print position of the mark A formed on the second surface P_2*f* of the sheet P read by the second scanner 701*b*. The position adjusting unit 511 adjusts the front and back positions of the mark A on the basis of the first adjustment reference misregistration amount monitored by the monitoring unit 513, and the second adjustment reference misregistration amount monitored by the monitoring unit 513.

Accordingly, the image reading device 7 can monitor the front and back misregistration of the mark A at low cost.

Further, according to the image forming system 1 according to the present embodiment, the above-described image reading device 7 and the image forming device 5 that forms an image on the sheet P are included.

Accordingly, the image forming system 1 can easily detect the sudden front and back misregistration of the images formed on the sheet P while accurately reading the front and back positions of the images at low cost, similarly to the case of the image reading device 7.

Further, the image forming system 1 can provide a low-cost feedback system as the entire system.

Further, according to a program of the present embodiment for causing a computer that controls the image reading device 7 in which the mark A is formed on the front and back of the sheet P by the image forming device 5, and including the first scanner 701*a* that reads the mark A and the second scanner 701*b* provided at a downstream side of the first scanner 701*a* and which reads the mark A, to function as the position adjusting unit 511 that adjusts the front and back positions of the mark A on the basis of the print position of the mark A read by at least one of the first scanner 701*a* and the second scanner 701*b*, and the monitoring unit 513 that monitors the front and back misregistration of the mark A on the basis of the front and back positions of the mark A adjusted by the position adjusting unit 511.

Accordingly, the program can easily detect the sudden front and back misregistration of images formed on the sheet P while accurately reading the front and back positions of the images at low cost, similarly to the case of the image reading device 7.

Second Embodiment

In a second embodiment, the same configuration as the first embodiment is denoted with the same reference sign, and description thereof is omitted. In the second embodiment, a machine difference between scanners 701 is adjusted using a master document, and monitoring of front and back misregistration of a mark A on a sheet P is conducted using the mark A formed on the master document as a design reference.

Figure 10:
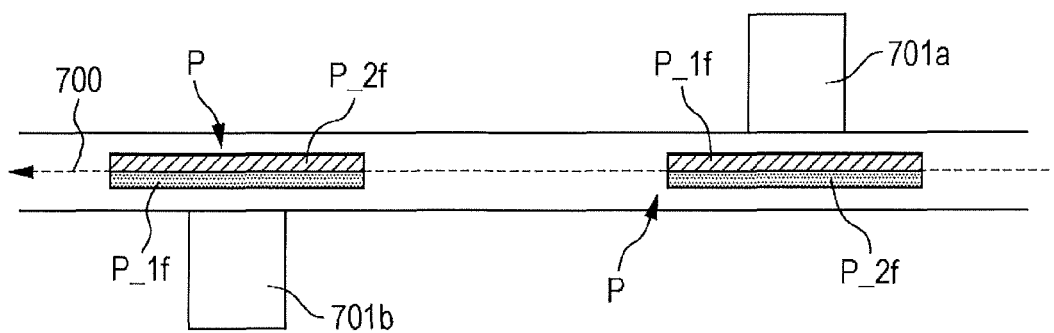
FIG. 10 is a diagram illustrating an example of a conveying path of sheets in a second embodiment of the present invention.
Figure 11:
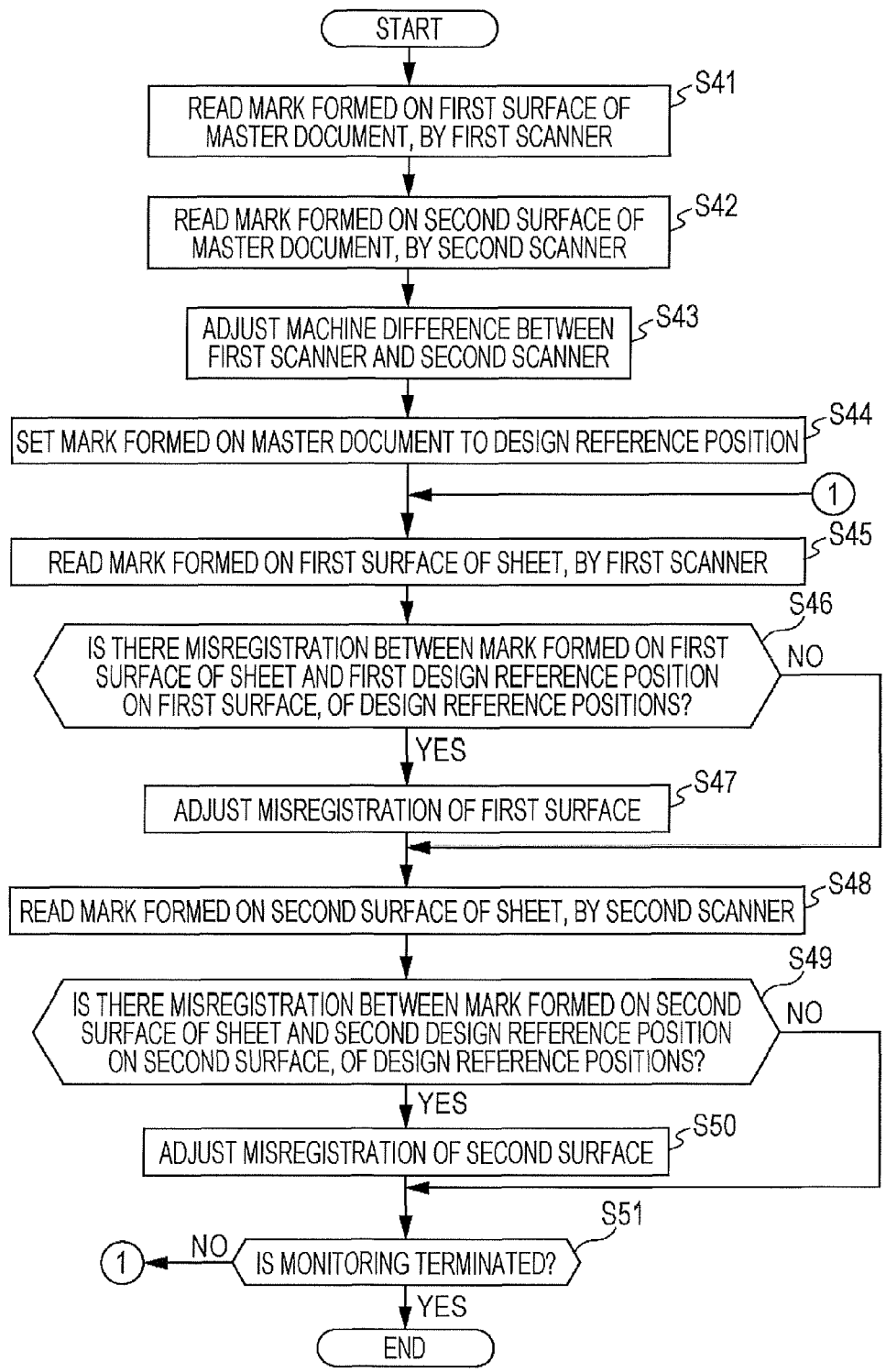
FIG. 11 is a flowchart for describing a control example in the second embodiment of the present invention.

FIG. 10 is a diagram illustrating an example of a conveying path 700 of sheets P in the second embodiment of the present invention. As illustrated in FIG. 10, a first scanner 701*a* and a second scanner 701*b* are provided along the conveying path 700. Therefore, the conveying path 700 of FIG. 10 allows the first scanner 701*a* to read a first surface P_1*f* of the sheet P, and the second scanner 701*b* to read a second surface P_2*f* of the sheet P.

On the conveying path 700 of FIG. 10, a master document is used as the sheet P in adjusting the machine difference between the scanners 701. The master document is a document in which a print position of the mark A formed on the first surface P_1*f* and a print position of the mark A formed on the second surface P_2*f* are formed on the same positions in a front and back penetrating direction of the sheet P.

Further, on the conveying path 700 of FIG. 10, a machine difference adjusting unit 515 adjusts the machine difference between the scanners 701 on the basis of the print position of the mark A formed on the first surface P_1*f* of the master document read by the first scanner 701*a*, and the print position of the mark A formed on the second surface P_2f of the master document read by the second scanner 701b.

Further, on the conveying path 700 of FIG. 10, a position adjusting unit 511 sets the print position of the mark A formed on the master document to a design reference position of the mark A, as an adjustment reference position of the mark A, in a case where the machine difference between the scanners 701 has been adjusted using the master document by the machine difference adjusting unit 515.

Further, on the conveying path 700 of FIG. 10, in monitoring front and back misregistration of the mark A formed on the sheet P, a monitoring unit 513 monitors a first design reference misregistration amount between the print position of the mark A formed on the first surface P_1f of the sheet P read by the first scanner 701a, and a first design reference position of the mark A formed on the first surface P_1f of the master document, of the design reference positions of the mark A set by the position adjusting unit 511.

Further, on the conveying path 700 of FIG. 10, in monitoring the front and back misregistration of the mark A formed on the sheet P, the monitoring unit 513 monitors a second design reference misregistration amount between the print position of the mark A formed on the second surface P_2f of the sheet P read by the second scanner 701b, and a second design reference position of the mark A formed on the second surface P_2f of the master document, of the design reference positions of the mark A set by the position adjusting unit 511.

Further, on the conveying path 700 of FIG. 10, the position adjusting unit 511 adjusts front and back positions of the mark A on the basis of the first design reference misregistration amount monitored by the monitoring unit 513 and the second design reference misregistration amount monitored by the monitoring unit 513.

Next, a control example of a control unit 51 on the conveying path 700 of FIG. 10 will be described. FIG. 10 is a diagram illustrating an example of the conveying path 700 of the sheet P in the second embodiment of the present invention.

In step S41, the first scanner 701a reads the mark A formed on the first surface P_1f of the master document. In step S42, the second scanner 701b reads the mark A formed on the second surface P_2f of the master document. In step S43, the machine difference between the first scanner 701a and the second scanner 701b is adjusted.

The processing of steps S41 to S43 above is machine difference adjustment processing.

In step S44, the mark A formed on the master document is set to the design reference position.

Note that the processing of step S44 is processing of determining the design reference position, which is performed in monitoring the front and back misregistration of the sheet P.

In step S45, the first scanner 701a reads the mark A formed on the first surface P_1f of the sheet P. In step S46, whether there is misregistration between the mark A formed on the first surface P_1f of the sheet P and the first design reference position on the first surface P_1f, of the design reference positions, is determined. When it is determined that there is misregistration between the mark A formed on the first surface P_1f of the sheet P and the first design reference position on the first surface P_1f, of the design reference positions, the processing proceeds to step S47. In step S47, the misregistration of the first surface P_1f is adjusted, and the processing proceeds to step S48. Meanwhile, when it is determined that there is no misregistration between the mark A formed on the first surface P_1f of the sheet P and the first design reference position on the first surface P_1f, of the design reference positions, the processing proceeds to step S48.

In step S48, the second scanner 701b reads the mark A formed on the second surface P_2f of the sheet P. In step S49, whether there is misregistration between the mark A formed on the second surface P_2f of the sheet P, and the second design reference position on the second surface P_2f, of the design reference positions, is determined. When it is determined that there is misregistration between the mark A formed on the second surface P_2f of the sheet P, and the second design reference position on the second surface P_2f, of the design reference positions, the processing proceeds to step S50. In step S50, the misregistration of the second surface P_2f is adjusted, and the processing proceeds to step S51. Meanwhile, when it is determined that there is no misregistration between the mark A formed on the second surface P_2f of the sheet P, and the second design reference position on the second surface P_2f, of the design reference positions, the processing proceeds to step S51.

In step S51, whether the monitoring is to be terminated is determined. When it is determined that the monitoring is to be terminated, the processing is terminated. Meanwhile, when it is determined that the monitoring is not to be terminated, the processing proceed to step S45.

The processing of steps S45 to S51 above is monitoring processing and position adjustment processing.

Figure 12:
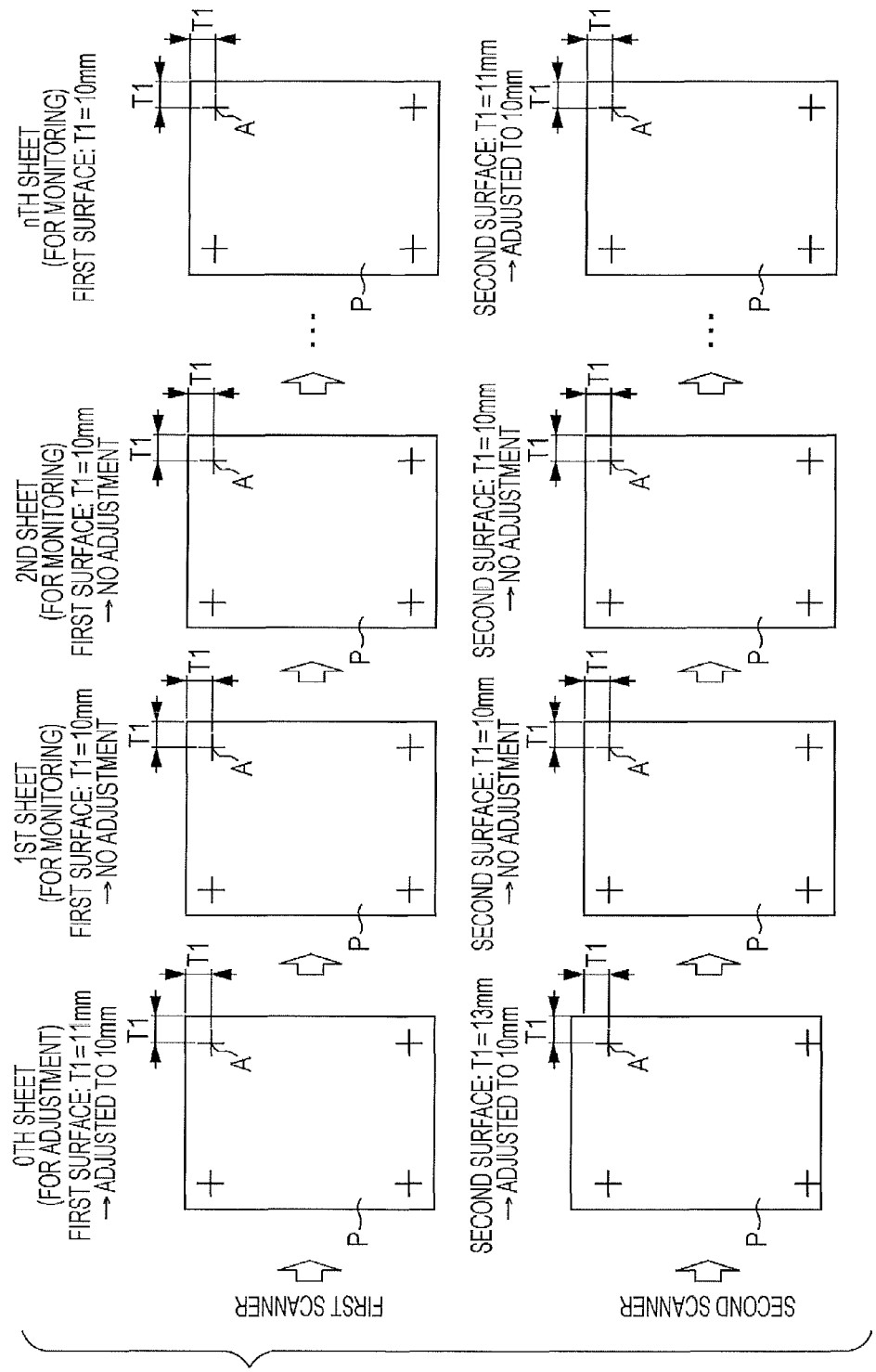
FIG. 12 is a diagram illustrating an adjustment example of front and back positions of a mark in the second embodiment of the present invention.

Next, machine difference adjustment and front and back misregistration adjustment will be specifically described. FIG. 12 is a diagram illustrating an adjustment example of front and back positions of a mark A in the second embodiment of the present invention. The 0th sheet of FIG. 12 corresponds to the master document for machine difference adjustment performed before the monitoring, and the 1st and subsequent sheets correspond to the sheets P for monitoring performed after the machine difference adjustment.

To be specific, in the 0th sheet, the machine difference adjustment of the scanners 701 performed before monitoring the front and back misregistration of the mark A formed on the master document is conducted. For example, the print position of the mark A on the second surface P_2f read by the second scanner 701b is adjusted in accordance with the print position of the mark A on the second surface P_2f of the master document. Further, processing of setting the design reference position to be used for monitoring is conducted before the 1st sheet for monitoring is read by the scanners 701.

Further, in the 1st and subsequent sheets, the front and back misregistration of the mark A is monitored on the basis of the design reference position set before the 1st sheet. For example, in the nth sheet, the print position of the mark A on the second surface P_2f read by the second scanner 701b is adjusted in accordance with the second design reference position set before the 1st sheet.

Note that the design reference position for monitoring is set to the print position of the mark A formed on the master document. However, an embodiment is not limited thereto. For example, in performing the machine difference adjustment in the 0th sheet, the position is adjusted in accordance with the master document, and thus the design reference position for monitoring may be the print position of the mark A of which the machine difference has been adjusted in the 0th sheet.

In the above description, an example of using the master document has been described. However, an embodiment is not limited to the master document as long as there is no misregistration like the master document. That is, a document T from which positional relationship can be read from the front and back by the same reference.

To be specific, a document T having a circular hole or a square hole penetrating from a surface to a back surface of the document T may be used. In this case, the same hole position can be read from the surface and the back surface of the document T. Further, a document T to which front and back position marks are affixed with special ink permeating from the surface to the back surface of the document T, or from the back surface to the surface of the document T may be used. Further, a document T to which a member penetrating from the surface to the back surface of the document T and does not hinder sheet passage, for example, a staple of a stapler is attached may be used.

As described above, in the image reading device 7, the machine difference between the scanners 701 is adjusted on the basis of the mark A formed on the master document, and the mark A formed on the master document is set to the design reference position of the mark A.

Therefore, the machine difference between the scanners 701 is adjusted on the basis of an absolute reference, and the front and back misregistration of the mark A formed on the sheet P is monitored on the basis of the absolute reference. Therefore, the machine difference between the scanners 701 and the front and back positions of the mark A can be accurately adjusted.

Further, in the image reading device 7, the first design reference misregistration amount between the print position of the mark A formed on the first surface P_1$f$ of the sheet P read by the first scanner 701$a$, and the design reference position of the mark A formed on the first surface P_1$f$ of the master document is monitored, and the second design reference misregistration amount between the print position of the mark A formed on the second surface P_2$f$ of the sheet P read by the second scanner 701$b$, and the design reference position of the mark A formed on the second surface P_2$f$ of the master document is monitored. The front and back positions of the mark A are adjusted on the basis of the first design reference misregistration amount and the second design reference misregistration amount.

Therefore, the front and back positions of the mark A are adjusted on the basis of the absolute front and back misregistration of the mark A. Therefore, the front and back misregistration of the mark A can be accurately monitored.

From the above description, according to the image reading device 7 of the present embodiment, the master document is used as the sheet P in adjusting the machine difference, the print position of the mark A formed on the first surface P_1$f$ of the master document and the print position of the mark A formed on the second surface P_2$f$ of the master document are formed on the same positions in the front and back penetrating direction of the sheet P, the machine difference adjusting unit 515 adjusts the machine difference on the basis of the print position of the mark A formed on the first surface P_1$f$ of the master document read by the first scanner 701$a$, and the print position of the mark A formed on the second surface P_2$f$ of the master document read by the second scanner 701$b$, and the position adjusting unit 511 sets the print position of the mark A formed on the master document to the design reference position of the mark A, as the adjustment reference position of the mark A, when the machine difference has been adjusted using the master document by the machine difference adjusting unit 515.

Accordingly, the image reading device 7 can accurately adjust the machine difference between the scanners 701 and the front and back positions of the mark A can be accurately adjusted.

Further, according to the image reading device 7 of the present embodiment, in monitoring the front and back misregistration of the mark A formed on the sheet P, the monitoring unit 513 monitors the first design reference misregistration amount between the print position of the mark A formed on the first surface P_1$f$ of the sheet P read by the first scanner 701$a$, and the first design reference position of the mark A formed on the first surface P_1$f$ of the master document, of the design reference positions of the mark A set by the position adjusting unit 511, and monitors the second design reference misregistration amount between the print position of the mark A formed on the second surface P_2$f$ of the sheet P read by the second scanner 701$b$, and the second design reference position of the mark A formed on the second surface P_2$f$ of the master document, of the design reference positions of the mark A set by the position adjusting unit 511, and the position adjusting unit 511 adjusts the front and back positions of the mark A on the basis of the first design reference misregistration amount monitored by the monitoring unit 513 and the second design reference misregistration amount monitored by the monitoring unit 513.

Accordingly, the image reading device 7 can accurately monitors the front and back misregistration of the mark A.

Third Embodiment

In a third embodiment, the same configuration as the first and second embodiments is denoted with the same reference sign, and description thereof is omitted. In the third embodiment, monitoring of front and back misregistration of a mark A is conducted by a second scanner 701$b$, using front and back positions of the mark A adjusted by a first scanner 701$a$, as a reference.

Figure 13:
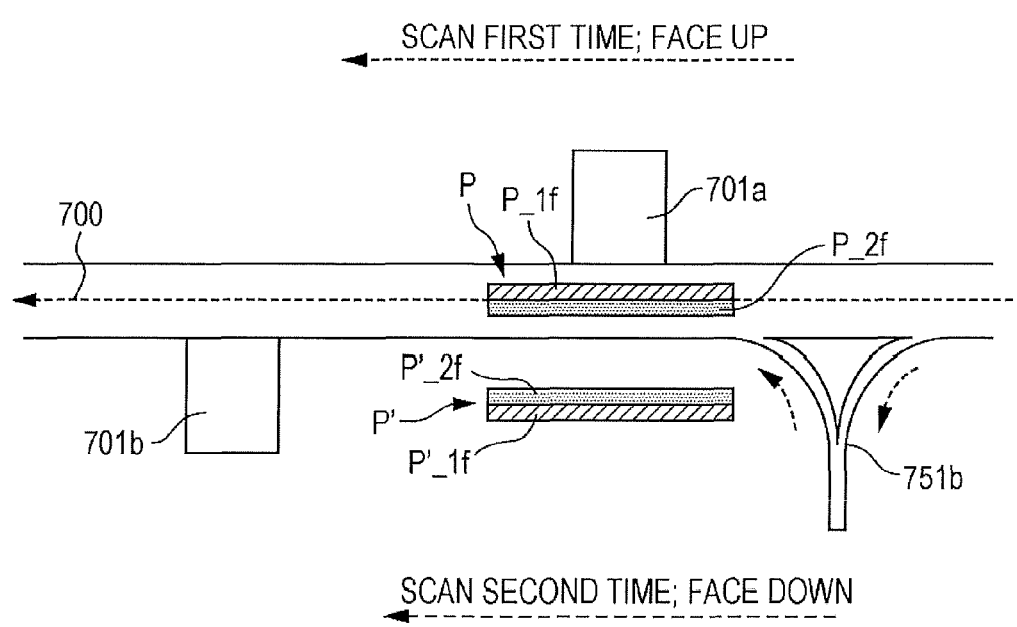
FIG. 13 is a diagram illustrating an example in which different sheets are conveyed on a conveying path of sheets in a third embodiment of the present invention.

FIG. 13 is a diagram illustrating an example in which different sheets P are conveyed on a conveying path 700 of sheets P in the third embodiment of the present invention. The conveying path 700 of FIG. 13 is provided with an inverting path 751$b$ at an upstream side of the first scanner 701$a$. The inverting path 751$b$ of FIG. 13 causes a face-up sheet P conveyed from the upstream side to face down, and conveys the sheet P to the first scanner 701$a$ at a downstream side. Therefore, if the sheet P passes through the inverting path 751$b$, the first scanner 701$a$ reads a second surface P_2$f$ of the sheet P, and the second scanner 701$b$ can read a first surface P_1$f$ of the sheet P. Further, if the sheet P does not pass through the inverting path 751$b$, the first scanner 701$a$ reads the first surface P_1$f$ of the sheet P, and the second scanner 701$b$ can read the second surface P_2$f$ of the sheet P.

On the conveying path 700 of FIG. 13, a position adjusting unit 511 adjusts front and back positions of the mark A on the basis of a print position of the mark A formed on the first surface P_1$f$ of the sheet P read by the first scanner 701$a$, and a print position of the mark A formed on the second surface P_2$f$ of the sheet P read by the first scanner 701$a$. Further, on the conveying path 700 of FIG. 13, the position adjusting unit 511 determines an adjustment reference position of the mark A, which serves as a reference of monitoring of the front and back misregistration of the mark A by a monitoring unit 513, in a case where the front and back positions of the mark A have been adjusted.

Further, on the conveying path 700 of FIG. 13, the second scanner 701*b* reads the mark A formed on the sheet P when the front and back misregistration of the mark A is monitored by the monitoring unit 513. Further, on the conveying path 700 of FIG. 13, in monitoring the front and back misregistration of the mark A formed on the sheet P, the monitoring unit 513 monitors an adjustment reference misregistration amount between the adjustment reference position of the mark A determined by the position adjusting unit 511 and the print position of the mark A read by the second scanner 701*b*.

Further, on the conveying path 700 of FIG. 13, the position adjusting unit 511 adjusts the front and back positions of the mark A on the basis of the adjustment reference misregistration amount monitored by the monitoring unit 513.

Figure 14:
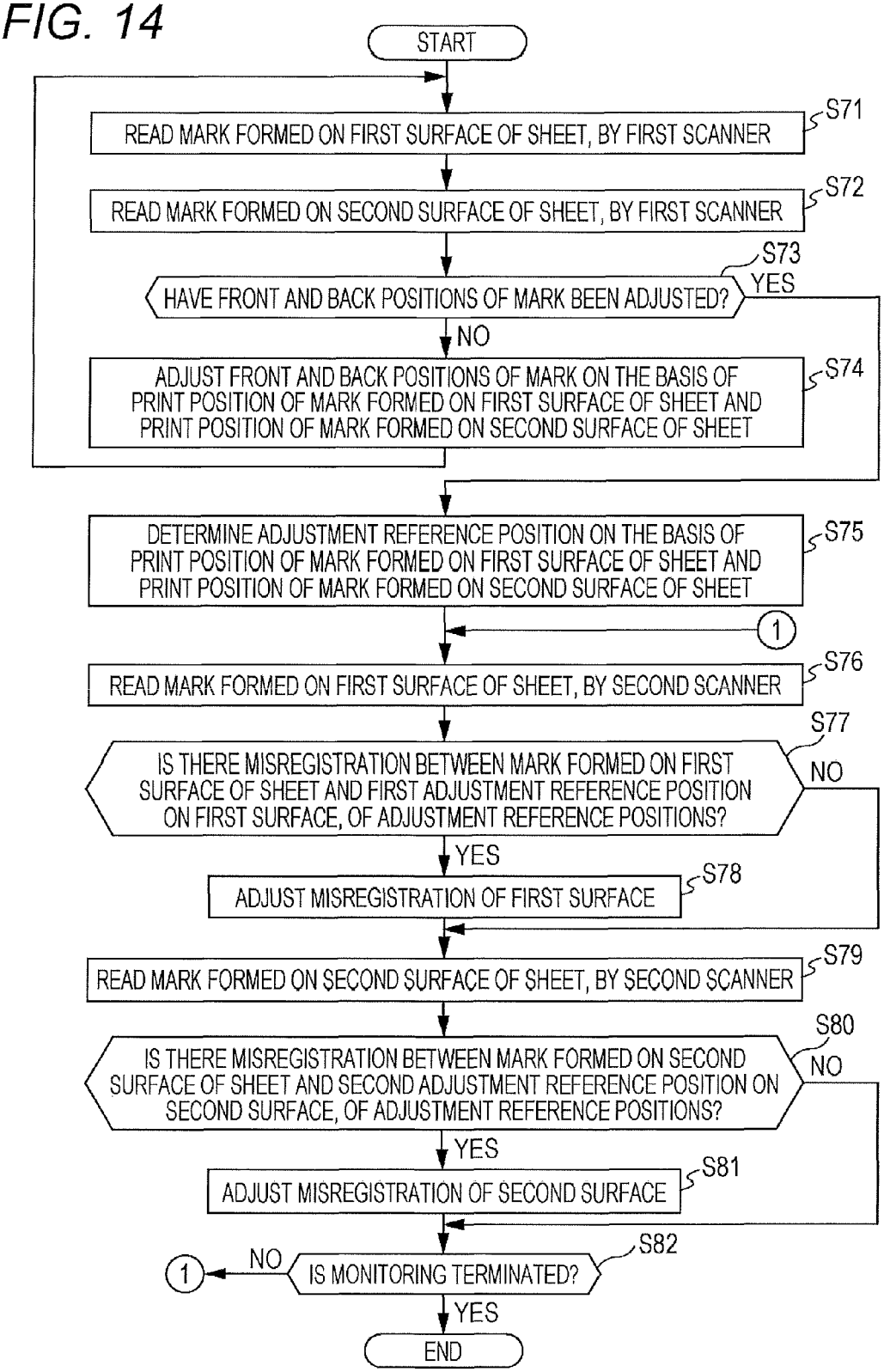
FIG. 14 is a flowchart for describing a control example in the third embodiment of the present invention.

Next, a control example of a control unit 51 on the conveying path 700 of FIG. 13 will be described. FIG. 14 is a flowchart for describing a control example in the third embodiment of the present invention.

In step S71, the first scanner 701*a* reads the mark A formed on the first surface P_1*f* of the sheet P. In step S72, the first scanner 701*a* reads the mark A formed on the second surface P_2*f* of the sheet P. In step S73, whether the front and back positions of the mark A have been adjusted is determined. When it is determined that the front and back positions of the mark A have been adjusted, the processing proceeds to step S75. In step S75, the adjustment reference position is determined on the basis of the print position of the mark A formed on the first surface P_1*f* of the sheet P, and the print position of the mark A formed on the second surface P_2*f* of the sheet P. Meanwhile, when it is determined that the front and back positions of the mark A have not been adjusted, the front and back positions of the mark A are adjusted on the basis of the print position of the mark A formed on the first surface P_1*f* of the sheet P and the print position of the mark A formed on the second surface P_2*f* of the sheet P in step S74, and the processing returns to step S71.

The processing of steps S71 to S75 above is processing of determining the adjustment reference position performed in monitoring front and back misregistration of the sheet P.

In step S76, the second scanner 701*b* reads the mark A formed on the first surface P_1*f* of the sheet P. In step S77, whether there is misregistration between the mark A formed on the first surface P_1*f* of the sheet P, and a first adjustment reference position of the first surface P_1*f*, of the adjustment reference positions, is determined. When it is determined that there is misregistration between the mark A formed on the first surface P_1*f* of the sheet P, and the first adjustment reference position of the first surface P_1*f*, of the adjustment reference positions, the processing proceeds to step S78. In step S78, the misregistration of the first surface P_1*f* is adjusted, and the processing proceeds to step S79. Meanwhile, when it is determined that there is no misregistration between the mark A formed on the first surface P_1*f* of the sheet P, and the first adjustment reference position of the first surface P_1*f*, of the adjustment reference positions, the processing proceeds to step S79.

In step S79, the second scanner 701*b* reads the mark A formed on the second surface P_2*f* of the sheet P. In step S80, whether there is misregistration between the mark A formed on the second surface P_2*f* of the sheet P, and a second adjustment reference position of the second surface P_2*f*, of the adjustment reference positions, is determined. When it is determined that there is misregistration between the mark A formed on the second surface P_2*f* of the sheet P, and the second adjustment reference position of the second surface P_2*f*, of the adjustment reference positions, the processing proceeds to step S81. In step S81, the misregistration of the second surface P_2*f* is adjusted, and the processing proceeds to step S82. Meanwhile, when it is determined that there is no misregistration between the mark A formed on the second surface P_2*f* of the sheet P, and the second adjustment reference position of the second surface P_2*f*, of the adjustment reference positions, the processing proceeds to step S82.

In step S82, whether the monitoring is to be terminated is determined. When it is determined that the monitoring is to be terminated, the processing is terminated. Meanwhile, when it is determined that the monitoring is not to be terminated, the processing proceeds to step S76.

The processing of steps S76 to S83 is monitoring processing and position adjustment processing.

Figure 15:
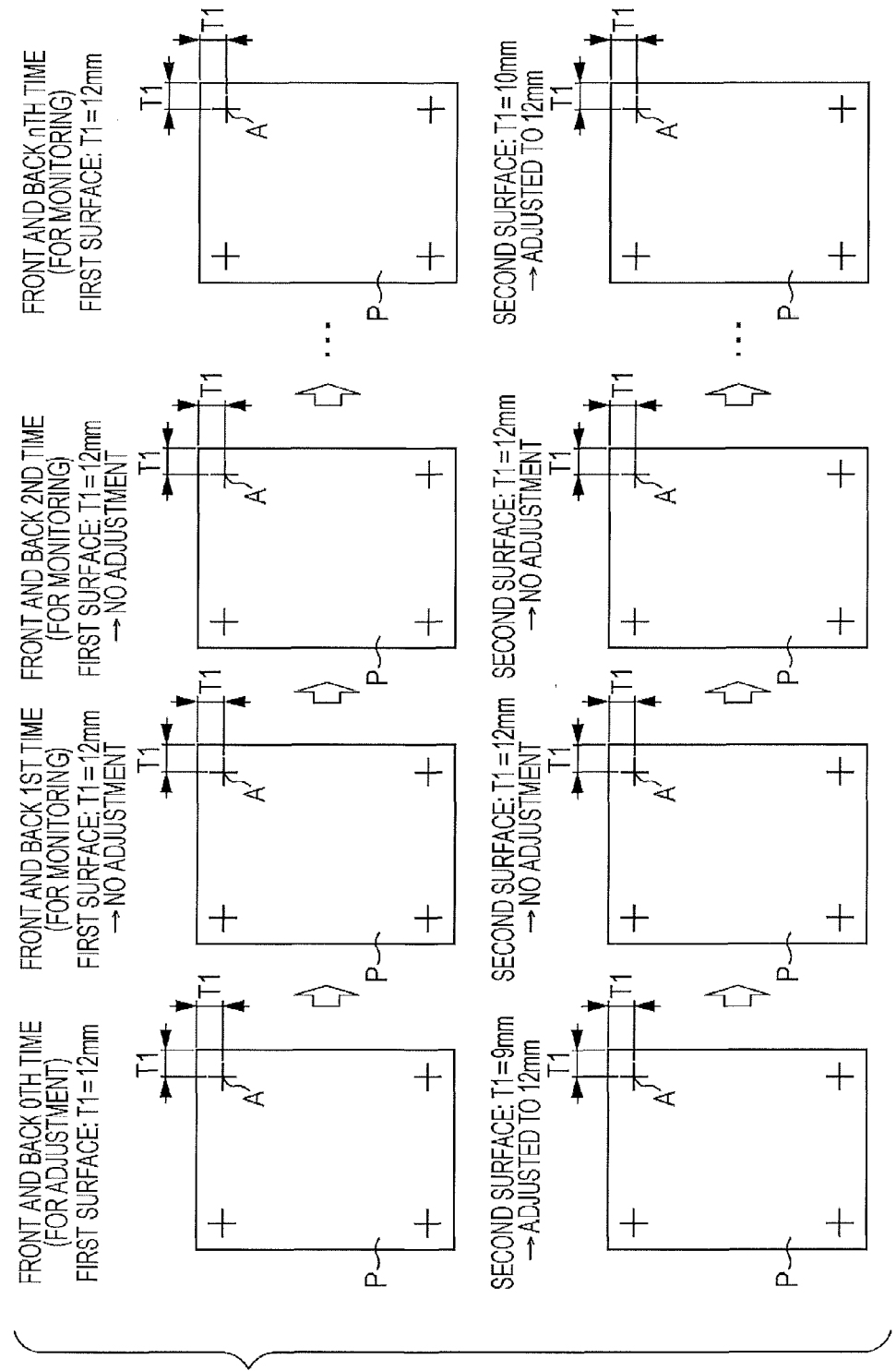
FIG. 15 is a diagram illustrating an adjustment example of front and back positions of a mark in the third embodiment of the present invention.

Next, front and back misregistration adjustment will be specifically described. FIG. 15 is a diagram illustrating an adjustment example of front and back positions of a mark A in the third embodiment of the present invention. The front and back 0th time of FIG. 15 corresponds to a sheet P for front and back positions adjustment performed before monitoring, and only a read result of the first scanner 701*a* is used. The front and back 1st and subsequent times of FIG. 15 correspond to the sheets P for monitoring performed after the front and back positions adjustment, and only a read result of the second scanner 701*b* is used.

To be specific, in the front and back 0th time, the front and back positions adjustment is conducted by the first scanner 701*a*, which is performed before the front and back misregistration of the mark A formed on the sheet P is monitored. For example, the print position of the mark A on the second surface P_2*f* read by the first scanner 701*a* is adjusted in accordance with the print position of the mark A on the first surface P_1*f* read by the first scanner 701*a*.

Further, in the front and back 1st time, processing of determining the adjustment reference position to be used for monitoring is conducted. In the front and back 2nd and subsequent times, the front and back misregistration of the mark A is monitored on the basis of the adjustment reference position determined in the front and back 1st time. For example, the print position of the mark A on the second surface P_2*f* read by the second scanner 701*b* in the nth sheet is adjusted in accordance with the second adjustment reference position determined in the 1st sheet.

Note that even if the print position of the mark A is matched with a design value, when the adjustment reference position is determined in the 1st sheet, the adjustment is performed such that no difference is caused between the print position of the mark A and the adjustment reference position determined in the 1st sheet.

Figure 16:
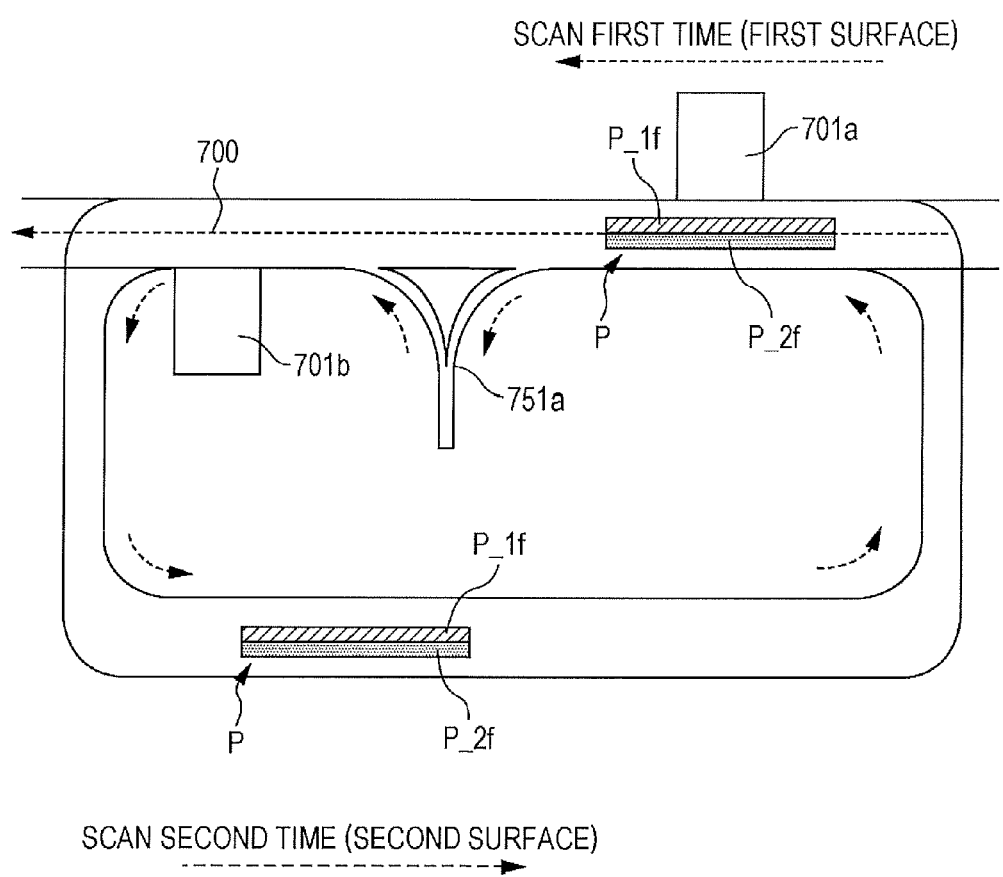
FIG. 16 is a diagram illustrating an example in which the same sheet is conveyed on the conveying path of the sheet in the third embodiment of the present invention.

In a case of the inverting path 751*b* provided on the conveying path 700 of FIG. 13, the front and back positions have been adjusted using the different sheets P. However, an embodiment is not limited thereto. FIG. 16 is a diagram illustrating an example in which the same sheet P is conveyed on the conveying path 700 of the sheet P in the third embodiment of the present invention.

The conveying path 700 of FIG. 16 is provided with an inverting path 751*a* between the first scanner 701*a* and the second scanner 701*b*. Therefore, the first scanner 701*a* can read the sheet P facing up and conveyed. Further, the inverting path 751*a* can cause the sheet P facing up and conveyed to face down and convey the sheet P to a downstream side. Therefore, the inverting path 751*a* of FIG. 16 can allow the first scanner 701*a* to read the first surface P_1*f* of the sheet P in the first time, and the first scanner 701a to read the second surface P_2f of the sheet P in the second time. Accordingly, the inverting path 751a of FIG. 9 can allow the scanners 701 to read the different surfaces of the same sheet P, that is, the first surface P_1f and the second surface P_2f.

As described above, in the image reading device 7, the front and back positions of the mark A are adjusted by the first scanner 701a on the basis of the print position of the mark A formed on the first surface P_1f of the sheet P and the print position of the mark A formed on the second surface P_2f of the sheet P.

Further, in the image reading device 7, in a case where the front and back positions of the mark A have been adjusted by the first scanner 701a, the adjustment reference position of the mark A, which serves as a reference of the front and back misregistration of the mark A, is determined.

Therefore, the front and back misregistration of the mark A is monitored using the read result of the first scanner 701a as a reference, and thus there is no need to adjust the machine difference between the scanners 701. Therefore, the front and back misregistration of the mark A can be monitored without being affected by the machine difference between the scanners 701.

Further, in the image reading device 7, the front and back misregistration amount of the mark A is monitored by the second scanner 701b, and the front and back misregistration of the mark A is adjusted on the basis of a monitoring result thereof.

Therefore, even if there is the machine difference between the second scanner 701b and the first scanner 701a, the second scanner 701b may just detect a relative difference from the adjustment reference position of the mark A determined on the basis of the read result of the first scanner 701a. Therefore, the front and back misregistration of the mark A can be especially significantly monitored without being affected by the machine difference between the scanners 701.

From the above description, according to the image reading device 7 of the present embodiment, in a case where the position adjusting unit 511 adjusts the front and back positions of the mark A on the basis of the print position of the mark A formed on the first surface P_1f of the sheet P read by the first scanner 701a, and the print position of the mark A formed on the second surface P_2f of the sheet P read by the first scanner 701a, the position adjusting unit 511 determines the adjustment reference position of the mark A, which serves as a reference of monitoring of the front and back misregistration of the mark A by the monitoring unit 513.

Accordingly, the front and back misregistration of the mark A can be monitored without being affected by the machine difference between the scanners 701.

Further, according to the image reading device 7, the second scanner 701b reads the mark A formed on the sheet P when the front and back misregistration of the mark A is monitored by the monitoring unit 513, the monitoring unit 513 monitors, in monitoring the front and back misregistration of the mark A formed on the sheet P, the adjustment reference misregistration amount between the adjustment reference position of the mark A determined by the position adjusting unit 511, and the print position of the mark A read by the second scanner 701b, and the position adjusting unit 511 adjusts the front and back positions of the mark A on the basis of the adjustment reference misregistration amount monitored by the monitoring unit 513.

Accordingly, the front and back misregistration of the mark A can be especially significantly monitored without being affected by the machine difference between the scanners 701.

As described above, the image forming device 5 and the image reading device 7 according to the present invention have been described on the basis of the embodiments. However, the present invention is not limited thereto, and changes may be added without departing from the gist of the present invention.

For example, in the present embodiment, an example of an arrangement configuration in which the sheet P is horizontally conveyed, and the colorimeter 703 and the proofread unit 705 are provided above and below the sheet P has been described. However, an embodiment is not particularly limited thereto, and for example, an arrangement configuration in which the sheet P is vertically conveyed, and the colorimeter 703 and the proofread unit 705 are provided on the right and left of the sheet P may be employed.

Further, an example in which the image read signal Sout is determined in the RGB colorimetric system as digital image data (RGB codes) including R, G, and B-color components has been described. However, an embodiment is not limited thereto, and the image read signal Sout may be determined by a different colorimetric system such as an L*a*b*colorimetric system.

Although the present invention has been described and illustrated in detail, it is clearly understood that the same is byway of illustrated and example only and is not to be taken by way of limitation, the scope of the present invention being interpreted by terms of the appended claims.

What is claimed is:

1. An image reading device including a first scanner and a second scanner provided at a downstream side of the first scanner, the first scanner and the second scanner each being independently configured to read a first mark formed on a front of a sheet or a second mark formed on a back of the sheet, the image reading device further comprising:
   a machine difference adjusting unit configured to adjust a machine difference between the first scanner and the second scanner
      on the basis of a prim position of the first mark read by the first scanner, and a print position of the first mark read by the second scanner, or
      on the basis of a print position of the second mark read by the first scanner, and a print position of the second mark read by the second scanner;
   a position adjusting unit configured to adjust
      front position of the first mark on the basis of the print position of the first mark read by at least one of the first scanner and the second scanner, and
      back position of the second mark on the basis of the print position of the second mark read by the at least one of the first scanner and the second scanner; and
   a monitoring unit configured to
      monitor front misregistration of the first mark on the basis of the front position of the first mark adjusted by the position adjusting unit, and
      monitor back misregistration of the second mark on the basis of the back position of the second mark adjusted by the position adjusting unit.

2. The image reading device according to claim 1, wherein
   the position adjusting unit determines an adjustment reference position of the first mark, the adjustment reference position serving as a reference of monitoring of the front misregistration of the first mark by the monitoring unit, and an adjustment reference position of the first mark, the adjustment reference position serving as a reference of monitoring of the back misregistration of the second mark by the monitoring unit, when the machine difference has been adjusted by the machine difference adjusting unit.

3. The image reading device according to claim 2, wherein
a master document is used as the sheet, in adjusting the machine difference,
the print position of the first mark formed on a first surface of the master document and the print position of the second mark formed on a second surface of the master document are formed in a same position in a front and back penetrating direction of the sheet,
the machine difference adjusting unit
adjusts the machine difference on the basis of the print position of the first mark formed on the first surface of the master document read by the first scanner and the print position of the second mark formed on the second surface of the master document read by the second scanner, and
the position adjusting unit
sets the print position of the first mark formed on the master document to a design reference position of the first mark, as the adjustment reference position of the first mark, and sets the print position of the second mark formed on the master document to a design reference position of the second mark, as the adjustment reference position of the second mark, when the machine difference has been adjusted using the master document by the machine difference adjusting unit.

4. The image reading device according to claim 3, wherein,
in monitoring the front and back misregistration of the first and second marks formed on the sheet,
the monitoring unit
monitors a first design reference misregistration amount between the print position of the first mark formed on a first surface of the sheet read by the first scanner, and a first design reference position of the first mark formed on the first surface of the master document, of the design reference positions of the first and second marks set by the position adjusting unit, and
monitors a second design reference misregistration amount between the print position of the second mark formed on a second surface of the sheet read by the second scanner, and a second design reference position of the second mark formed on the second surface of the master document, of the design reference positions of the first and second marks set by the position adjusting unit, and
the position adjusting unit
adjusts the front position of the first mark on the basis of the first design reference misregistration amount monitored by the monitoring unit, and adjusts the back position of the second mark on the basis of the second design reference misregistration amount monitored by the monitoring unit.

5. The image reading device according to claim 1, wherein
the machine difference adjusting unit adjusts the machine difference on the basis of the first or second mark formed on a same surface of the sheet.

6. The image reading device according to claim 5, wherein,
in monitoring the front and back misregistration of the first and second marks formed on the sheet,
the monitoring unit
monitors a first adjustment reference misregistration amount between a first adjustment reference position of the first mark formed on a first surface of the sheet, of the adjustment reference positions of the first and second marks determined by the position adjusting unit, and the print position of the first mark formed on the first surface of the sheet read by the first scantier, and
monitors a second adjustment reference misregistration amount between a second adjustment reference position of the second mark formed on a second surface of the sheet, of the adjustment reference positions of the first and second marks determined by the position adjusting unit, and the print position of the second mark formed on the second surface of the sheet read by die second scanner, and
the position adjusting unit
adjusts the front position of the first mark on the basis of the first adjustment reference misregistration amount monitored by the monitoring unit, and
adjusts the back position of the second mark on the basis of the second adjustment reference misregistration amount monitored by the monitoring unit.

7. The image reading device according to claim 1, wherein
the position adjusting unit
determines an, adjustment reference position of the first mark, the adjustment reference position serving as a reference of monitoring of the front misregistration of the first mark by the monitoring unit, when the position adjusting unit has adjusted the front position of the first mark on the basis of the print position of the first mark formed on a first surface of the sheet read by the first scanner, and
determines an adjustment reference position of the second mark, the adjustment reference position serving as a reference of monitoring of the back misregistration of the second mark by the monitoring unit, when the position adjusting unit has adjusted the back position of the second mark on the basis of the print position of the second mark formed on a second surface of the sheet read by the first scanner.

8. The image reading device according to claim 7, wherein
the second scanner reads each of the first and second marks formed on the sheet, when the front and back misregistration of the first and second marks is monitored by the monitoring unit,
the monitoring unit monitors an adjustment reference misregistration amount between the adjustment reference position of the first mark determined by the position adjusting unit and the print position of the first mark read by the second scanner, in monitoring the front misregistration of the first mark formed on the sheet, and monitors an adjustment reference misregistration amount between the adjustment reference position of the second mark determined by the position adjusting unit and the print position of the second mark read by the second scanner, in monitoring the back misregistration of the second mark formed on the sheet, and
the position adjusting unit adjusts the front position of the first mark and the back position of the second mark on the basis of the adjustment reference misregistration amount monitored by the monitoring unit.

9. An image forming system comprising:
the image reading device according to claim 1; and
an image forming device.

10. A non-transitory recording medium storing a computer readable program for causing a computer that controls an image reading device including a first scanner and a second scanner provided at a downstream side of the first scanner, the first scanner and the second scanner each being independently configured to read a first mark formed on a front of a sheet or a second mark formed on a back of the sheet, to function as:

a machine difference adjusting unit configured to adjust a machine difference between the first scanner and the second scanner on the basis of a print position of the first mark read by the first scanner, and a print position of the first mark read by the second scanner, or on the basis of a print position of the second mark read by the first scanner, and a print position of the second mark read by the second scanner;

a position adjusting unit configured to
adjust front position of the first mark formed on the front of the sheet on the basis of a print position of the first mark read by at least one of the first scanner and the second warmer; and
adjust back position of the second mark formed on the back of the sheet on the basis of a print position of the second mark read by the at least one of the first scanner and the second scanner; and a monitoring unit configured to
monitor front misregistration of the first mark on the basis of the front position of the first mark adjusted by the position adjusting unit, and
monitor back misregistration of the second mark on the basis of the back position of the second mark adjusted by the position adjusting unit.

\* \* \* \* \*